United States Patent
Shimada

(10) Patent No.: US 7,249,221 B2
(45) Date of Patent: Jul. 24, 2007

(54) STORAGE SYSTEM HAVING NETWORK CHANNELS CONNECTING SHARED CACHE MEMORIES TO DISK DRIVES

(75) Inventor: Kentaro Shimada, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 265 days.

(21) Appl. No.: 10/852,358

(22) Filed: May 25, 2004

(65) Prior Publication Data

US 2005/0204096 A1    Sep. 15, 2005

(30) Foreign Application Priority Data

Mar. 12, 2004    (JP) .............................. 2004-071126

(51) Int. Cl.
*G06F 12/08* (2006.01)

(52) U.S. Cl. ...................... 711/130; 711/113; 711/120; 711/119

(58) Field of Classification Search ..................... None
See application file for complete search history.

(56) References Cited

U.S. PATENT DOCUMENTS

| | | | |
|---|---|---|---|
| 6,480,934 B1 * | 11/2002 | Hino et al. | 711/114 |
| 6,889,286 B2 * | 5/2005 | Hino et al. | 711/114 |
| 2003/0191890 A1 * | 10/2003 | Okamoto et al. | 711/112 |
| 2004/0019740 A1 * | 1/2004 | Nakayama et al. | 711/113 |
| 2004/0123028 A1 | 6/2004 | Kanai et al. | |
| 2005/0108476 A1 * | 5/2005 | Tanaka et al. | 711/114 |
| 2005/0114592 A1 | 5/2005 | Jin et al. | |

FOREIGN PATENT DOCUMENTS

| | | |
|---|---|---|
| JP | 07-200187 | 8/1995 |
| JP | 10-063576 | 3/1998 |
| JP | 11-203201 | 7/1999 |
| JP | 2003-345520 | 12/2003 |

* cited by examiner

*Primary Examiner*—B. James Peikari
(74) *Attorney, Agent, or Firm*—Mattingly, Stanger, Malur & Brundidge, P.C.

(57) ABSTRACT

A storage system is arranged to speed up the operation and easily duplicate data without the capacity of the cache memory being so large even if lots of host computers are connected with the storage system. This storage system includes channel adapters, disk drives, disk adapters, and network switches. Further, the front side cache memories connected with the channel adapters and the back side cache memories connected with the disk adapters are provided as two layered cache system. When a request for writing data is given to the storage system by the host computer, the data is written in both the front side cache memory and the back side cache memory. The write data is duplicated by placing the write data in one of the front side cache memories and one of the back side cache memories or two of the back side cache memories.

12 Claims, 26 Drawing Sheets

FIG.4

| V | HOST ID | LUN | LOGICAL BLOCK ADDRESS | BLOCK DATA |
|---|---|---|---|---|
| 1 | 1250abcd | 08 | 123a bde0 | 12 ab 34 fe 56 7e 89 cd ··· 12 23 45 56 |
|  |  |  |  |  |
| 1 | 33210981 | 12 | 7819 abcd | aa bb cc dd ee ff 00 11 ··· 44 55 66 77 |

FIG.5

| V | HOST ID | LUN | LOGICAL BLOCK ADDRESS | RAID GROUP ID | BLOCK ADDRESS | BLOCK LENGTH |
|---|---|---|---|---|---|---|
| 1 | 12345678 | 34 | 5566 7788 | ddee ff00 | aabb cc00 | 1230 |
|  |  |  |  |  |  |  |
| 1 | abcdef01 | 56 | 99aa bbcc | 1122 3344 | 0011 2200 | 4560 |

FIG.6

| V | RAID GROUP ID | DISK ADAPTER NUMBER |
|---|---|---|
| 1 | ddee ff00 | ffdd ee99 |
|  |  |  |
| 1 | 1122 3344 | 0123 4567 |

FIG.7

| V | D | HOST ID | LUN | LOGICAL BLOCK ADDRESS | BLOCK DATA |
|---|---|---------|-----|----------------------|------------|
| 1 | 1 | 1250abcd | 08 | 123a bde0 | 12 ab 34 fe 56 7e 89 cd ··· 23 45 56 |
| ⋮ | ⋮ | ⋮ | ⋮ | ⋮ | ⋮ |
| 1 | 0 | 33210981 | 12 | 7819 abcd | aa bb cc dd ee ff 00 11 ··· 55 66 77 |

FIG.8

| V | RAID GROUP ID | DISK ADAPTER NUMBER | PAIRED DISK ADAPTER NUMBER |
|---|---------------|---------------------|----------------------------|
| 1 | ddee ff00 | ffdd ee99 | ffdd ee98 |
| ⋮ | ⋮ | ⋮ | ⋮ |
| 1 | 1122 3344 | 0123 4567 | 0123 4566 |

FIG.9

| V | D | RAID GROUP ID | BLOCK ADDRESS | BLOCK DATA |
|---|---|---------------|---------------|------------|
| 1 | 1 | ddee ff00 | 123a bde0 | 12 ab 34 fe 56 7e 89 cd ··· 23 45 56 |
| ⋮ | ⋮ | ⋮ | ⋮ | ⋮ |
| 1 | 0 | 1122 3344 | 7819 abcd | aa bb cc dd ee ff 00 11 ··· 55 66 77 |

FIG.10

| V | RAID GROUP ID | RAID TYPE | DRIVE NUMBER 0 | DRIVE NUMBER 1 | DRIVE NUMBER 2 | DRIVE NUMBER 3 |
|---|---|---|---|---|---|---|
| 1 | ddee ff00 | 5 | 1234 5678 | 1234 5679 | 1234 567a | 1234 567b |
| ... | ... | ... | ... | ... | ... | ... |
| 1 | 1122 3344 | 10 | abcd ef00 | abcd ef01 | abcd ef02 | abcd ef03 |

FIG.11

| V | RAID GROUP ID | BLOCK ADDRESS | DESTINATION CHANNEL ADAPTER NUMBER |
|---|---|---|---|
| 1 | ddee ff00 | 123a bde0 | 9876 5432 |
| ... | ... | ... | ... |
| 1 | 1122 3344 | 7819 abcd | fedc ba98 |

FIG.12

| V | RAID GROUP ID | BLOCK ADDRESS | DESTINATION CHANNEL ADAPTER NUMBER OR PAIRED DISK ADAPTER NUMBER |
|---|---|---|---|
| 1 | ddee ff00 | 123a bde0 | 0123 4567 |
| ... | ... | ... | ... |
| 1 | 1122 3344 | 7819 abcd | 89ab cdef |

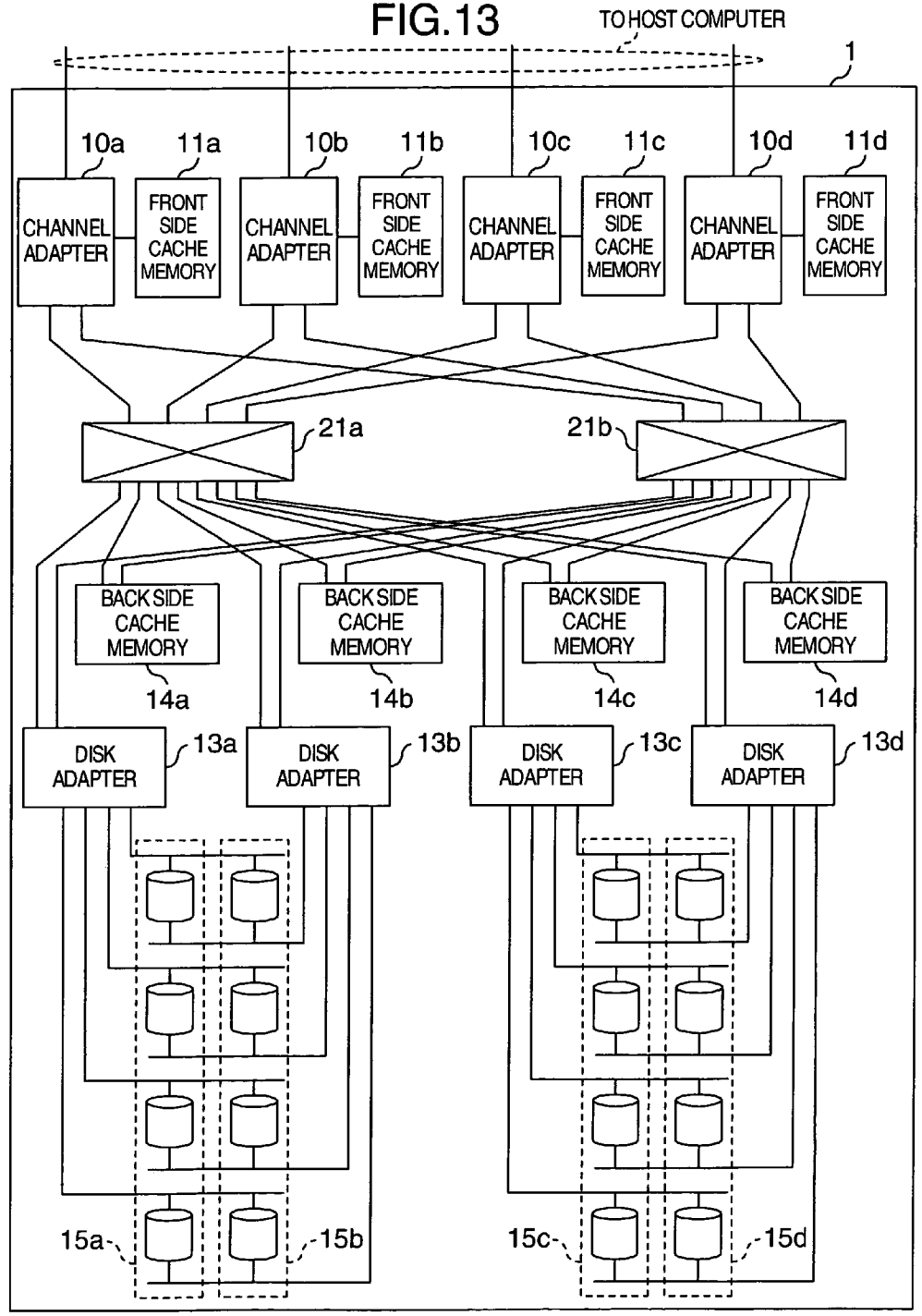

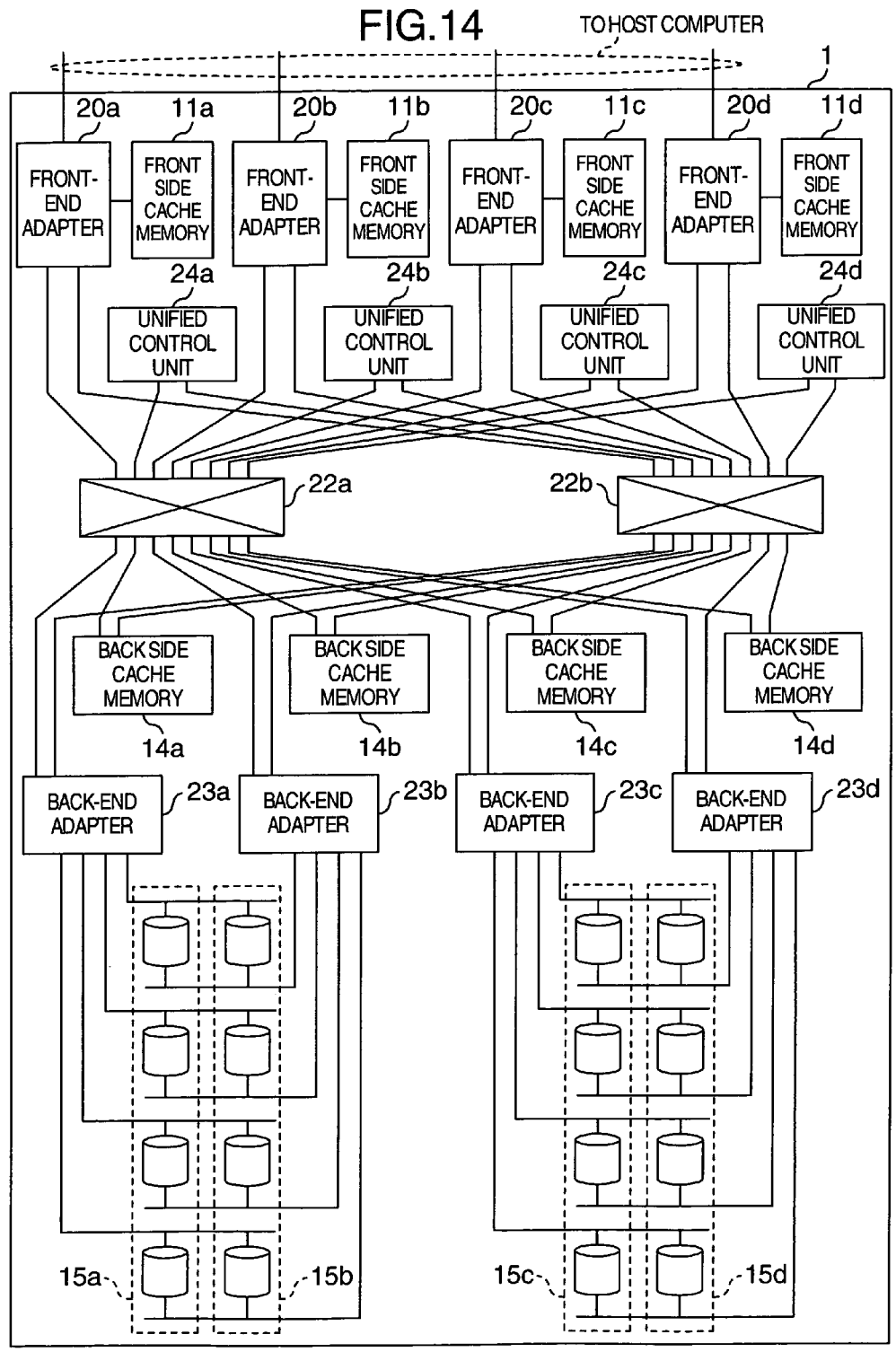

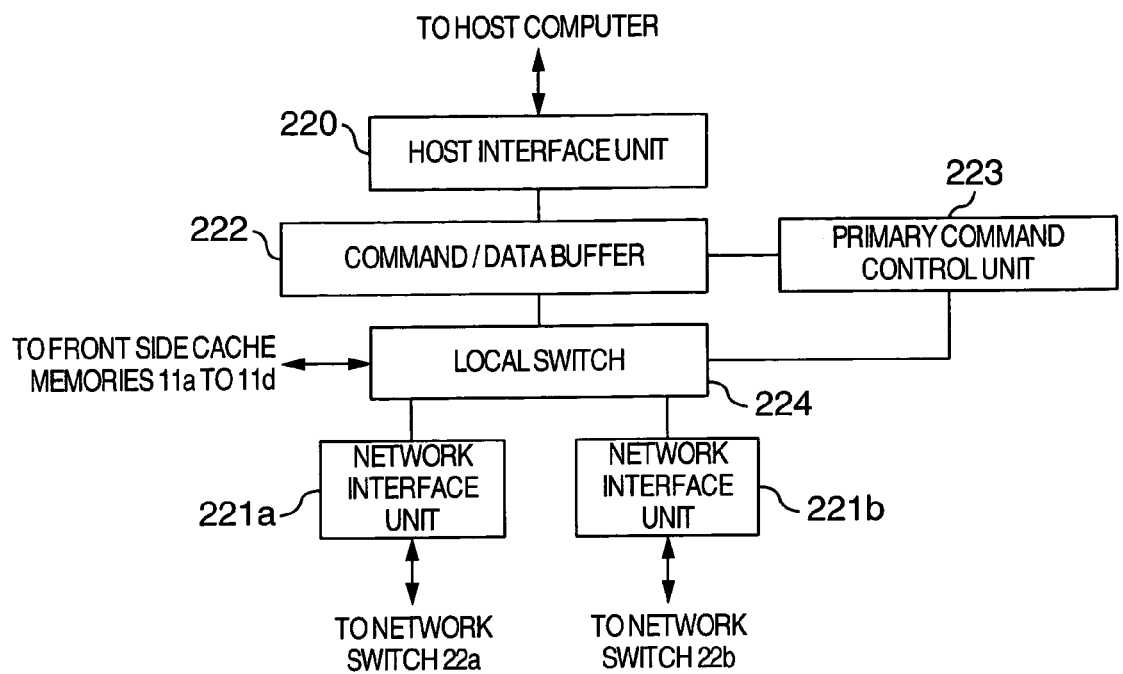
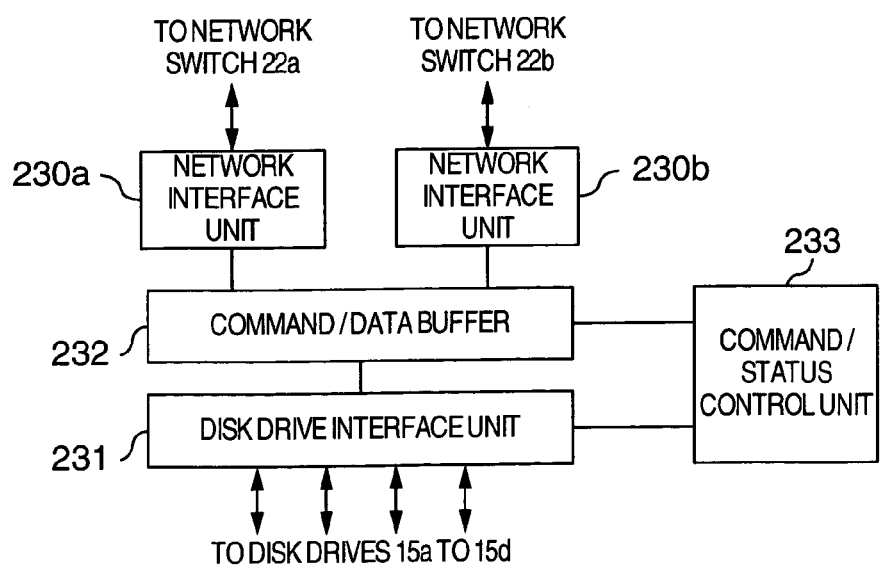

| V | RAID GROUP ID | BLOCK ADDRESS | DESTINATION CHANNEL ADAPTER NUMBER | LATEST DIRTY MARK |
|---|---|---|---|---|
| 1 | ddee ff00 | 123a bde0 | 9876 5432 | 0 |
| | | | | |
| 1 | 1122 3344 | 7819 abcd | fedc ba98 | 1 |

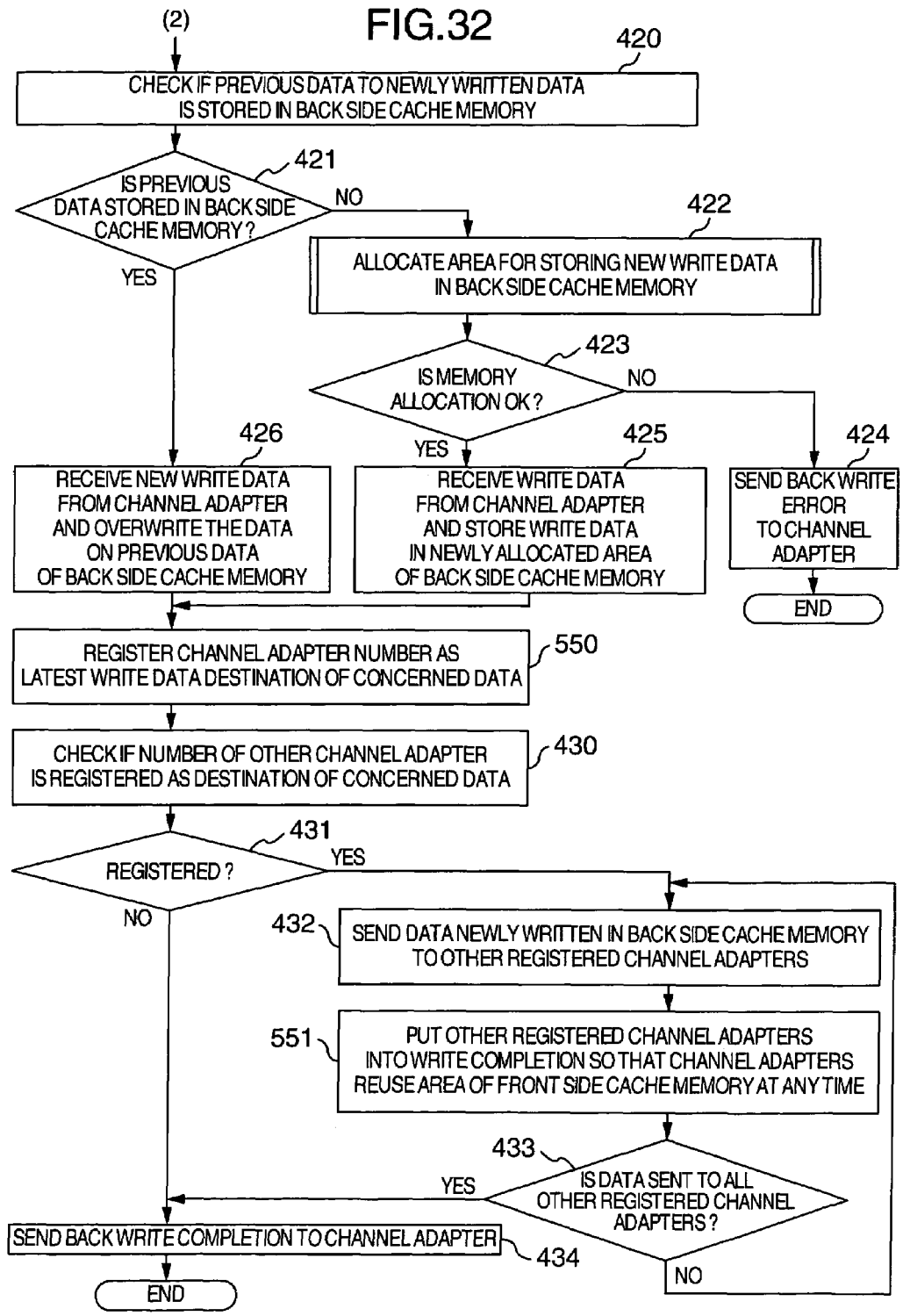

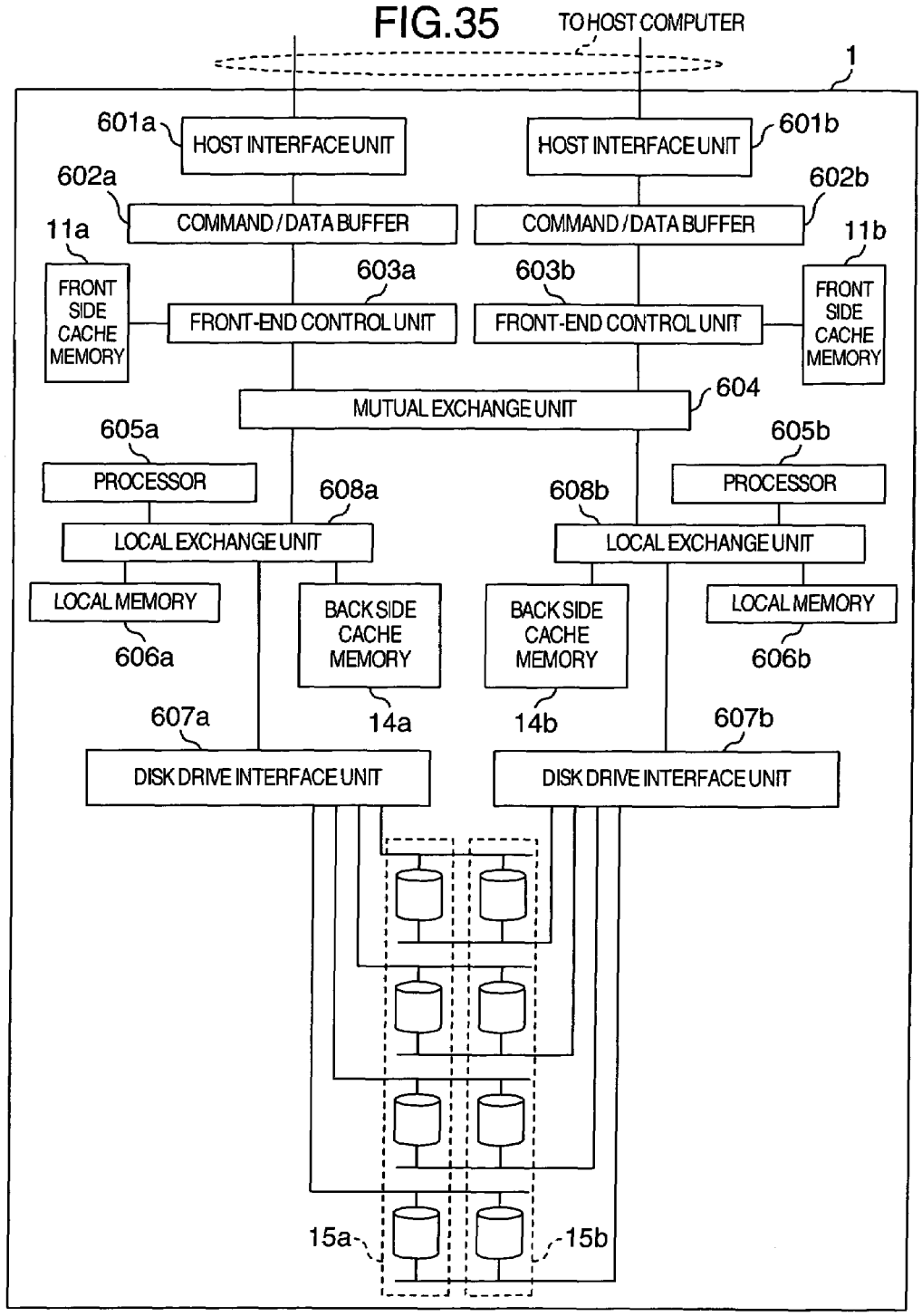

STORAGE SYSTEM HAVING NETWORK CHANNELS CONNECTING SHARED CACHE MEMORIES TO DISK DRIVES

INCORPORATION BY REFERENCE

The present application claims priority from Japanese patent application No. 2004-071126 filed on Mar. 12, 2004, the content of which is hereby incorporated by reference into this application.

BACKGROUND OF THE INVENTION

The present invention relates to storage systems equipped with disk drives, and more particularly to methods of controlling cache memory of those storage systems.

Conventionally, in order to speed up an I/O operation of data to and from a host system (host computer), a storage system equipped with disk drives, in particular, a disk array system equipped with a plurality of disk drives includes a cache memory composed of far faster semiconductor memories than the disk drives themselves. Through the use of the cache memory, the storage system has operated to temporarily store data to be read from or written in the host computer. For example, this type of technology is disclosed in JP-A-11-203201.

In such a technology as disclosed in JP-A-11-203201, for the purpose of facilitating control of the cache memory and sharing the cache memory among a plurality of host computers, the data to be stored in the cache memory, in particular, the data written by the host computer is managed and controlled in a manner to correspond with the disk drive. That is, as to the data stored in the cache memory, which the disk drive is and where the location on the disk drive thereof to or from which the data is written or read is are registered. If a plurality of host computers read or write the data on the same disk drive, those host computers are arranged to share the same cache memory and use the same area on the cache memory.

Further, as the prior art, JP-A-2003-345520 discloses an example of a storage system arranged to control the cache memory in a manner to correspond with the host computer and locate the sharing network between the cache memory and the disk drive. This technology of JP-A-2003-345520 is arranged to make access to the cache memory without having to convert a virtual volume into a physical disk drive, and no passage time of the data through the sharing network being needed, which makes it possible to speed up the operation of the storage system as viewed from the host computer.

Further, the prior art of the hierarchical storage system is disclosed in JP-A-10-063576 or JP-A-07-200187.

However, in such a system as disclosed in JP-A-11-203201, for the data, in particular, the write data, all cache memories located in the storage system are required to be physically shared from all host computers to be connected with the storage system. Hence, the system should have some kind of sharing network connecting between the host interfaces to be connected with the host computer and the cache memories. This thus requires a passage time of the data through the sharing network in transferring the data with the cache memory as viewed from the host computer, which leads to a limitation of speeding up the operation of the storage system.

Further, the conventional system has been often arranged as follows. A disk drive is virtualized to the host computer so that the virtual volume may be viewed from the host computer. Then, in the storage system, this virtual volume is translated into the physical disk drive. In this system, in order to make access to the cache memory, it is necessary to translate the virtual volume into the physical disk drive and then make access to the corresponding cache memory to the disk drive. This requires an additional translation time and makes the faster operation impractical.

Moreover, in the technology disclosed in JP-A-2003-345520, if the cache memory may be connected with lots of host computers, the cache memories are not shared among the different host computers, so that the cache memory may be provided for each host computer individually. This needs a great deal of cache memories. Further, for duplicating the data written by the host computer in the cache memory for the purpose of improving reliability, a further double capacity of cache memories, or a rather sophisticated control such as a sharing of the cache memory by about two host computers is required.

In the technology disclosed in JP-A-10-063576 or JP-A-07-200187, the upper cache memory to be connected with the host computer is unique for the purpose of simplifying the coherence control of the upper cache memory and the lower cache memory. If, therefore, lots of host computers are tried to be connected with the cache memory, the capacity of the upper cache memory is required to be gigantic. This leads to difficulty in reducing the cost and improving the performance.

SUMMARY OF THE INVENTION

It is an object of the present invention to provide a storage system which is arranged to suppress bloat of the cache memory if lots of host computers are connected with the cache memory as speeding up the operation as viewed from the host computer and further to facilitate duplicate of the cache memory for the purpose of improving the reliability.

In order to overcome the foregoing difficulty, according to an aspect of the present invention, a storage system comprises:

a plurality of channel adapters to be connected with a host system;

first cache memories being connected with the channel adapters respectively and temporarily storing data to be read from or written in the host system;

a plurality of disk drives;

one or more disk adapters to be connected with the disk drives;

one or more second cache memories being connected with the disk adapters respectively and temporarily storing data to be read from or written in the disk drive; and one or more networks to be connected between the channel adapter and the disk adapter.

According to another aspect of the invention, the storage system is arranged to duplicate the data to be written from the host system in the first and the second cache memories when the data is written in the cache memories.

According to another aspect of the invention, the storage system is arranged to duplicate the data to be written from the host system in two of the second cache memories.

According to another aspect of the invention, a method of controlling cache memory of storage systems each having one or more first cache memories for temporarily storing data to be read from or written in the host system, one or more disk drives, and one or more second cache memories for temporarily storing data to be read from or written in the disk drive, comprises the steps of:

writing the write data sent from the host system in the first cache memory and the second cache memory;

sending the data written in the second cache memory to the other first cache memories for updating the data if the previous data to the written data have been stored in the other first cache memories; and holding the data written in the first cache memory until writing the written data from the second cache memory into the disk drive is finished.

The present invention is effective in improving a response speed to the host computer by using the first cache memories, reducing the cost of the storage system by sharing the second cache memories with a plurality of host computers, and improving the reliability of the storage system by duplicating the data of the cache memory with the second cache memories.

Other objects, features and advantages of the invention will become apparent from the following description of the embodiments of the invention taken in conjunction with the accompanying drawings.

BRIEF DESCRIPTION OF THE DRAWINGS

FIG. 4 is a view showing a first example of a data structure of block data stored in a front side cache memory in the first embodiment;

FIG. 5 is a view showing a data structure of translation information used for translating a logic volume number and a logical block address in the channel adapter into a RAID group ID and a block address in the disk adapter;

FIG. 6 is a view showing a data structure of translation information used for specifying a disk adapter with the RAID group ID;

FIG. 7 is a view showing a second example of a data structure of block data to be stored in a front side cache memory;

FIG. 8 is a view showing a data structure of control information used for specifying a disk adapter and a paired disk adapters with the RAID group ID;

FIG. 9 is a view showing a data structure of block data to be stored in a back side cache memory;

FIG. 10 is a view showing a data structure of control information used for specifying a disk drive with the RAID group ID;

FIG. 11 is a view showing a first data structure of control information used for recording a channel adapter by which data is sent;

FIG. 12 is a view showing a data structure of control information used for recording the channel adapter by which data is sent and its paired disk adapter;

FIG. 13 is a block diagram showing an overall arrangement of a storage system according to a second embodiment of the present invention;

FIG. 14 is a block diagram showing an overall arrangement of a storage system according to the third embodiment of the present invention;

FIG. 15 is a diagram showing an exemplary arrangement of an FE adapter included in a third embodiment of the present invention;

FIG. 16 is a diagram showing an exemplary arrangement of a BE adapter included in the third embodiment;

FIG. 32 is a flowchart showing a third control method of controlling write of data in the back side cache memory, included in the cache memory controlling method 4;

FIG. 35 is a block diagram showing an overall arrangement of a storage system according to a fourth embodiment of the present invention.

DESCRIPTION OF THE EMBODIMENTS

The storage systems according to the first to the fourth embodiments of the present invention will be described in detail with reference to the appended drawings. The storage system according to the embodiment of the present invention is characterized to have two kinds of cache memories, that is, a front side cache memory served as a first cache memory and a back side cache memory served as a second cache memory. Further, the method of controlling the cache memory of the storage system is characterized by the control method in which these two kinds of cache memories are associated with each other. The following description concerns with the storage systems according to the embodiments of the present invention. In actual, however, the present invention is not limited to these embodiments and is intended to include the subject matters within the scope of the technical spirit with which the invention concerns.

First Embodiment

Figure 1:
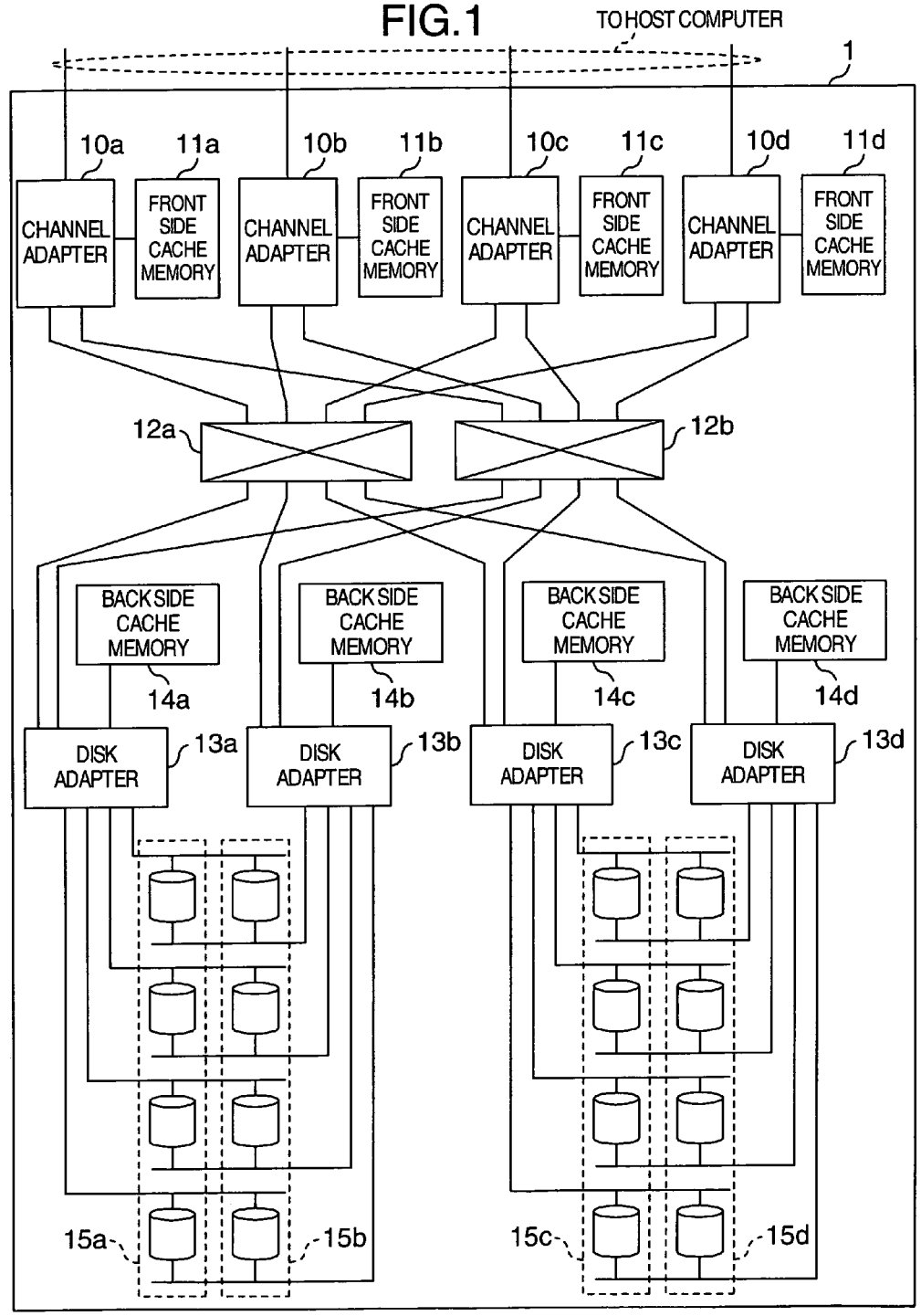
FIG. 1 is a block diagram showing an overall arrangement of a storage system according to the first embodiment of the present invention.

FIG. 1 is a block diagram showing an overall arrangement of the storage system according to the first embodiment of the present invention. In FIG. 1, a numeral 1 denotes a storage system, which includes channel adapters 10a to 10d for controlling connection with a host computer, disk drives 15a to 15d, disk adapters 13a-13d being connected with the disk drives 15a to 15d and for controlling read or write of data from or to the disk drives, and network switches 12a and 12b for connecting the channel adapters 10a to 10d with the disk adapters 13a to 13d. Further, the storage system 1 is equipped with front side cache memories 11a to 11d and back side cache memories 14a to 14d, the front side cache memories 11a to 11d being served as the first kind of cache memories and respectively connected with the channel adapters 10a to 10d, and the back side cache memories 14a to 14d being served as the second kind of cache memory and respectively connected with the disk adapters 13a to 13d. In addition, the host computer may be connected with the channel adapter in a one-to-one connecting relation. Or, the host computer may be connected with any one of the channel adapters through any network.

When a request for reading data is received by one of the channel adapters 10a to 10d from the host computer, the storage system 1 selects the front side cache memory 11 being connected with the channel adapter 10 having received the reading request from the front side cache memories 11a to 11d and then to check if the front side cache memory 11 stores the relevant data. If the relevant data is stored in the front side cache memory 11, the data is read from the corresponding location in the selected front side cache and then sent back to the host computer. If the data is not stored therein, the storage system 1 operates to specify one of the disk adapters 13a to 13d being connected with the disk drive in which the data is to be stored, for controlling the disk drive connected therewith and then to send the reading request to the specified disk adapter 13. The disk adapter operates to select the back side cache memory 14 being connected with the disk adapter itself from the back side cache memories 14a to 14d and to check if the data to be requested is stored in the back side cache memory 14.

If the concerned data is stored in the selected back side cache memory, the data is read therefrom and then is given back to the channel adapter. If the relevant data is not stored in the back side cache memory, the disk drive where the relevant data is stored and its location are specified. Then, the data is read out of the specified disk drive and is stored in the back side cache memory. Further, the relevant data is sent back to the channel adapter. The channel adapter writes in the front side cache memory the data sent back from the disk adapter and sends back the data to the host computer.

As to the writing request, at first, the channel adapter receives new data to be written from the host computer. The new data is stored in the front side cache memory. Then, the storage system 1 operates to specify one of the disk adapters 13a to 13d for controlling the disk drive in which the new write data is to be recorded and send the new data to be written to the specified disk adapter so that the disk adapter may write the sent data in the back side cache memory 14 being connected with the disk adapter, selected from the back side cache memories 14a to 14d. The new data having being written in the back side cache memory will be written in the disk drives 15a to 15d on a proper occasion by means of the method to be discussed below.

The channel adapter operates to check if the previous data corresponding to the newly written data is stored in the front side cache memory. If the data is stored, the previous data is replaced with the newly written data. If not, the newly written data is registered as the latest value of the data item.

The foregoing series of operations are realized by the control functions provided in the channel adapters 10a to 10d and the disk adapters 13a to 13d. In particular, the channel adapters 10a to 10d and the disk adapters 13a to 13d may provide their corresponding processors so that they may execute those operations on the software program loaded thereon.

Figure 2:
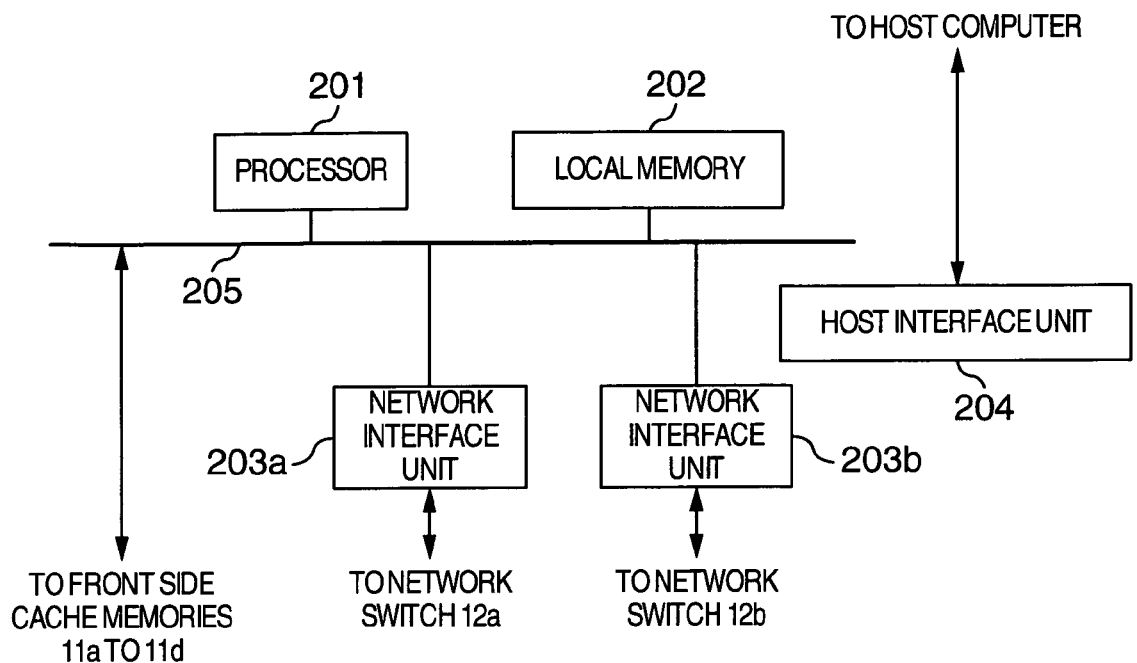
FIG. 2 is a diagram showing a channel adapter arranged to have a processor in the first embodiment.

FIG. 2 is a diagram showing an exemplary one of the channel adapters 10a to 10d provided with their processors in the storage system according to the first embodiment of the present invention. As shown, each of the channel adapters 10a to 10d includes a processor 201, a local memory 202, a host interface unit 204 connected with the host computer, and network interface units 203a and 203b connected with network switches 12a and 12d. In FIG. 2, the processor 201, the local memory 202, the host interface unit 204, and the network interface units 203a and 203b are connected with each another through a processor bus 205. Further, the front side cache memories 11a to 11d are also connected with the processor bus 205.

The processor bus 205 may be composed of not only a bus that permits one piece of data to be transferred at a time but also a switch that permits plural pieces of data to be transferred at a time if the sending and the receiving sources are different in respective pieces of data. The local memory 202 stores a program that is executed by the processor 201. Moreover, the local memory 202 temporarily stores a control command from the host computer received by the host interface unit 204 as well as the control information to be sent to the disk adapters 13a to 13d through the network interface units 203a and 203b.

Figure 3:
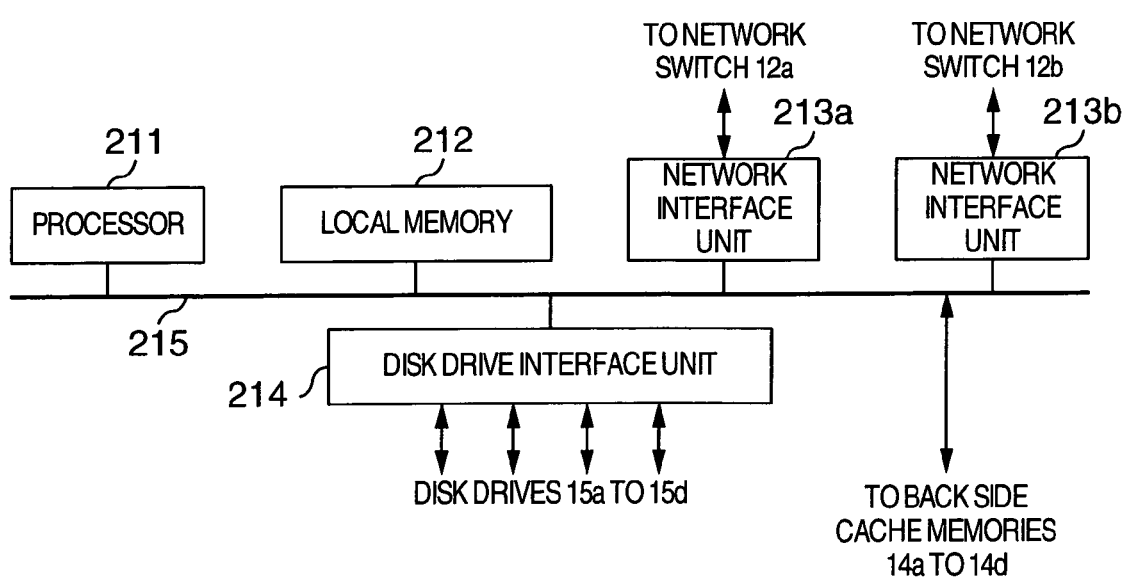
FIG. 3 is a diagram showing a disk adapter arranged to have a processor in the first embodiment.

FIG. 3 is a diagram showing an exemplary one of the disk adapters 13a to 13d provided with their processors in the storage system according to the first embodiment of the present invention. As shown, each of the disk adapters 13*a* to 13*d* includes a processor 211, a local memory 212, a disk drive interface unit 214 connected with disk drives 15*a* to 15*d*, and network interface units 213*a* and 213*b* connected with network switches 12*a* and 12*b*. In FIG. 3, the processor 211, the local memory 212, the disk drive interface unit 214, and the network interface units 213*a* and 213*b* are connected with each other through a processor bus 215. Further, the back side cache memories 14*a* to 14*d* are also connected with the processor bus 215.

Like the processor bus 205, the processor bus 215 may be composed of not only a bus that permits one piece of data to be transferred at a time but also a switch that permit plural pieces of data to be transferred at a time if the sending and the receiving sources are different in respective pieces of data. Like the local memory 202, the local memory 212 stores a program that is executed by the processor 211. The local memory 212 temporarily stores control commands to the disk drives to be transferred through the disk drive interface unit 214 as well as control information to be transferred with the channel adapters 11*a* to 11*d* through the network interface units 213*a* and 213*b*. In addition, the channel adapters and the disk adapters shown in FIGS. 2 and 3 may be applied to the second embodiment of the present invention to be discussed below.

Each of the front side cache memories 11*a* to 11*d* is required to record the data itself to be read or written as well as its location, its logical volume and the host computer where the data is located. FIG. 4 shows the exemplary data structure for that purpose. Herein, the logical volume means a storage area virtually provided to the host computer by the storage system. The storage system constructs the logical volume using a physical storage area included in the storage system itself. In the storage system 1 as shown in FIG. 1, the data I/O is executed at a certain block unit. Hence, the data structure shown in FIG. 4 may be composed at a block unit. That is, in FIG. 4, the data structure is composed of a combination of a mark information item V that indicates the data is valid, a host system identification that identifies the host computer, a logical volume number LUN that identifies the logical volume, a logical block address that identifies a block in the logical block, and block data.

The host computer operates to specify to the storage system 1 the data to be read or written with the logical volume number LUN and the logical block address. Hence, under the control of the processor 201 provided in the channel adapter 11, the storage system 1 enables to retrieve the data structure as shown in FIG. 4 in the front side cache memory 11 merely by adding the host system identification for identifying the requesting host computer to the request given by a certain host computer and thereby to check if the data is located. The information included in the request given from the host computer may be used without any translation. This makes it possible to speed up the process. The host system identification may be constantly assigned to each host computer by the storage system 1 when the host computer is connected with the storage system 1. The host system identification may be registered and managed in each of the channel adapters 10*a* to 10*d*.

If the data requested by the host computer does not exist in the front side cache memory, it is necessary to specify a disk adapter to which the data request is sent and send the data request to the disk adapter thus specified. For this purpose, each of the channel adapters 10*a* to 10*d* is required to hold the information about the specific data request to be sent and the target disk adapter to which the specific data request is to be sent. FIGS. 5 and 6 show the exemplary data structure for this purpose. The data structure shown in FIGS. 5 and 6 may be stored in the front side cache memories 11*a* to 11*d* connected with the channel adapters 10*a* to 10*d* respectively together with the data structure shown in FIG. 4 or in the local memory 202 of each of the channel adapters 10*a* to 10*d*.

The data structure shown in FIG. 5 is composed to indicate how the data request from the host computer identified by a host system identification, a LUN and a logical block address is interpreted to the RAID group ID that is the management unit in the disk adapters 13*a* to 13*d* and the block address. Herein, the management unit means that the storage system (disk adapter) indicates the unit at which the physical storage area included in the storage system itself is managed. The physical storage area is managed in blocks. The storage system creates one management unit from plural blocks. In the left end of the data structure in FIG. 5, a valid mark V is shown. The valid mark V indicates that each entry of the data structure is valid. In FIG. 5, with the logical block address shown in the data structure as the start address, the blocks indicated in the block length in the right end are converted into the data block having as a start address the block address within the management unit indicated by the RAID group ID.

FIG. 6 shows a data structure that includes a RAID group ID and a disk adapter number that controls the management unit indicated by the corresponding RAID group ID. Likewise, a valid mark V is included which shows if the data of each entry with the data structure is valid.

If the data does not exist in a front side cache memory 11 connected to a channel adapter, each of the channel adapters 10*a* to 10*d* (in particular, the processor 201 located in the channel adapters 10*a* to 10*d*) operates to convert a combination of the host system identification, the LUN, and the logical block address into a combination of the RAID group ID and the block address through the use of the data structure shown in FIG. 5. Then, the disk adapter 13 to which the data request is to be sent is specified by the data structure shown in FIG. 6.

If the request given from the host computer is a write of data, the data to be written is stored in the front side cache memory 11 first, then the data is constantly sent to the disk adapter 13 by the channel adapter 10, and is caused to be written in the back side cache memory 14. Hence, the data structure shown in FIGS. 5 and 6 is used every time the data is written. At this time, for improving the reliability of the data to be written, the duplicate of the data may be considered. The method therefor is the following first or second method. The duplicate of the data termed herein means a duplicate of the data to be executed until the data is written on the disk drive. The host computer's reading and modifying and then writing data back is termed "write-back". This operation is executed in the same process as the new write. In this embodiment, the new write and the write-back may be applied.

At first, the first method is executed to hold the write data in the front side cache memory 11 until the write data is written (or written back) on one of the disk drives 15*a* to 15*d* and duplicate the write data between the front side cache memories 11*a* to 11*d* and the back side cache memories 14*a* to 14*d* during the holding time. In this method, only the required area of the data for duplicating the data is allocated in the cache memory. Hence, the effective use of the cache memory is made possible as to the overall storage system 1. However, the front side cache memory 11 is required to hold the data, so that the using capacity of the front side cache memory 11 is restricted.

FIG. 7 shows the data structure that includes a dirty mark D for managing if the concerned data is written back (written) on the disk drive in addition to the data structure of FIG. 4 stored in each of the front side cache memories 11*a* to 11*d*. When the capacity of a front side cache memory 11 connected to a channel adapter 10 is not enough, the channel adapter 10 is required to refer to the data structure as shown in FIG. 7 and hold the entry of the data structure when the dirty mark D indicates the data is not still written back on the disk drive. When the dirty mark D indicates the completion of writing-back of the data on the disk drive in the data structure shown in FIG. 7, it is possible to collect the entry of the data structure and return the area of the write data in the front side cache memory into the free area.

Each of the disk adapters 13*a* to 13*d* operates to write back the written data from the concerned back side cache memory 14 into one of the disk drives 15*a* to 15*d*. Then, as will be discussed below, the disk adapter 13 operates to notify the channel adapter 10 about the completion of the writing-back of the data and then change the dirty mark D as indicating the completion of the write of the data on the disk drive.

The second method for duplicating the write data is executed by using two of the back side cache memories 14*a* to 14*d*. In the second method, the write data may be loaded in two back side cache memories and the front side cache memory. Hence, the using efficiency of the cache memory is made worse as to the overall storage system 1. However, whether or not the data is written from the back side cache memory back to the disk drive, each entry of the data structure shown in FIG. 4 stored in the front side cache memory can be collected and used again.

In the second method, each of the channel adapters 10*a* to 10*d* is required to specify the disk adapter to which the data is to be written (or written back) and the disk adapter connected with the second back side cache memory whose data is to be duplicated. FIG. 8 shows the replaceable data structure with the structure shown in FIG. 6. The data structure shown in FIG. 8 holds the second disk adapter number for each RAID group ID in addition to the data structure shown in FIG. 6.

The channel adapter 10 duplicates the write data and then sends the duplicate of the write data to the two disk adapters shown in the data structure shown in FIG. 8. Each disk adapter writes the write data in the corresponding back side cache memory. However, only the first disk adapter operates to write the data on one of the disk drives 15*a* to 15*d* on the proper occasion. The second disk adapter does not usually write the data on the disk drive. The write data (or its duplicate) from the host computer stored in the back side cache memory of the second disk adapter is discarded, when the write of the data from the back side cache memory of the first disk adapter to the disk drive is executed properly. If the write of the data onto the disk drive in the first disk adapter is not caused by some failure, the second disk adapter is caused to write the data on the disk drive.

FIG. 9 shows the exemplary data structure stored in each of the back side cache memories 14*a* to 14*d*. Like the front side cache memory in FIG. 4, the data structure is composed of a combination of a valid mark V for indicating that the data is valid, a RAID group ID for identifying a management unit, a block address for identifying a block in the management unit, and block data. The data structure shown in FIG. 9 further includes a dirty mark D for indicating if the written data is written back onto the disk drive if the data is written from the channel adapter to the host computer. Each of the disk adapters 13*a* to 13*d* (more particularly, each processor 211 of the disk adapters 13*a* to 13*d*) operates to refer to the data structure shown in FIG. 9 stored in each of the back side cache memories 14*a* to 14*d* and thereby to manage the types of data written in the back side cache memory.

The actual read and write of the disk drive is required to refer to the information for specifying the management unit to be managed by a RAID group ID and the disk drive where the management unit is to be stored. FIG. 10 shows an exemplary data structure used for this information. The data structure shown in FIG. 10 may be stored in the back side cache memories 14*a* to 14*d* together with the data structure shown in FIG. 9. Or, it may be stored in each local memory 212 of the disk adapters 13*a* to 13*d*.

The data structure shown in FIG. 10 is composed of a combination of a valid mark V for indicating each entry of the data structure is valid, a RAID group ID for identifying a management unit, a RAID type, and drive numbers 0 to 3 for identifying four disk drives for each management unit. The RAID type is used for executing the RAID-level (RAID1, RAID5) identification. Moreover, it may be used as the additional information such as identification of the parity generating method of the RAID. For example, it is considered that it may be used for identifying the following RAID composition. That is, in FIG. 10, four disk drives are grouped for one management unit. If the RAID5 is composed of four drives, composing of one parity drive, and three data drives may be considered. On the other hand, it may be considered that eight disk drives are grouped for one management unit. Further, one parity drive to seven data drives or two parity drives to six data drives may be considered. Moreover, the other RAID compositions are made possible.

When the data is written by the host computer, the other channel adapter rather than the channel adapter having accepted the write request may refer to the data. In this case, the previous data before the write (data before update) to the write data is held in the front side cache memory of another channel adapter. This previous data is required to be updated or discarded. In order to guarantee the coherency of plural front side cache memories, it is considered that each disk adapter registers that which data having been sent to which the front side cache memory of the channel adapter. If registered, in a case that the data is updated (modified and written) through a certain channel adapter, the event of the data write is notified to another channel adapter where those data items are registered so that the channel adapter may update or discard the data.

FIG. 11 shows an exemplary data structure used for recording the channel adapter to which the data of each of the disk adapters 13*a* to 13*d* is to be sent. Like the data structure shown in FIG. 10, the data structure as shown in FIG. 11 may be stored in the back side cache memories 14*a* to 14*d* together with the data structure shown in FIG. 9. Or, it may be stored in each local memory 212 of the disk adapters 13*a* to 13*d*.

The first data structure shown in FIG. 11 (the second data structure will be discussed below with respect to FIG. 31) is composed of a combination of a valid mark V for indicating each entry of the data structure is effective, a RAID group ID for identifying a management unit, a block address for identifying a data block within the management unit, and a destination channel adapter number. If a certain piece of data is sent to plural channel adapters, it is possible to provide one entry for one channel adapter each. Those entries having the same RAID group ID and the block address and in which each channel adapter is registered in the destination channel adapter number. Further, it is possible to expand the data structure as shown in FIG. 11 and to register a certain number of destination channel adapter numbers in one entry.

If the write data is received from the host computer to a certain channel adapter, each of the disk adapters 13a to 13d operates to refer to the data structure as shown in FIG. 11, retrieve another channel adapter that may refer to the data, and notifies these retrieved channel adapter of the event of the data write so that the previous data to the present data written on the front side cache memory need to be updated or discarded.

The second method of duplicating the write data in two back side cache memories includes notifying the second disk adapter of completion data writing-back to the disk drives, if the first disk adapter writes back the data written from the back side cache memory to the disk drives and then discarding the duplicated data on the back side cache memory of the second disk adapter. In order to notify the second disk adapter of the data writing-back, each disk adapter is required to register the second disk adapter for each piece of data.

FIG. 12 shows an exemplary data structure used for that purpose. This data structure is composed by expanding the data structure shown in FIG. 11 so as to register the second disk adapter number in addition to the destination channel adapter number. Like the data structure shown in FIG. 11, this type of data structure may be stored in the back side cache memories 14a to 14d together with the data structure of FIG. 9. Or, it may be stored in each local memory 212 of the disk adapters 13a to 13d.

Second Embodiment

FIG. 13 is a block diagram showing an overall arrangement of the storage system according to the second embodiment of the present invention. Like the arrangement shown in FIG. 1, in FIG. 13, the storage system 1 includes channel adapters 10a to 10d being connected with a host computer and for controlling the connecting operation, disk drives 15a to 15d, disk adapters 13a to 13d being connected with the disk drives 15a to 15d and for controlling the read and write of data from and to the disk drives, and network switches 21a and 21b being connected with the channel adapters 10a to 10d and the disk adapters 13a to 13d. Further, the storage system 1 includes the front side cache memories 11a to 11d served as the first kind of cache memory in the channel adapters 10a to 10d, respectively.

Unlike the first embodiment shown in FIG. 1, the second embodiment of the present invention is arranged so that the back side cache memories 14a to 14d served as the second kind of cache memory are not directly connected with the disk adapters 13a to 13d respectively but are connected with the network switches 21a and 21b. The disk adapter 13, the back side cache memory 14, and the channel adapter are connected with one another through the network switch 21. The back side cache memories 14a to 14d are logically allocated to the disk adapters 13a to 13d through the network switches 21a and 21b, respectively. The allocation of these back side cache memories is controlled by the processors located inside the disk adapter 13.

The use of the connecting arrangement shown in FIG. 13 prevents the back side cache memories 14a to 14d from being physically fixed to the disk adapters 13a to 13d, respectively, so that the back side cache memories 14a to 14d may be flexibly used within the storage system 1. For example, if the disk adapter 13a needs to store a great deal of data but the disk adapter 13c does not need to store so great a deal of data, the allocation of data area to the disk adapter 13a in the back side cache memories 14a to 14d is increased, while the allocation of data area to the disk adapter 13c is reduced.

The arrangement and the operation of the channel adapters 10a to 10d, the front side cache memories 11a to 11d, the network switches 21a and 21d, the disk adapters 13a to 13d, the back side cache memories 14a to 14d, and the disk drives 15a to 15d are likewise to those of the first embodiment shown in FIG. 1.

Third Embodiment

FIG. 14 is a block diagram showing an overall arrangement of the storage system according to the third embodiment of the present invention. In FIG. 14, the storage system 1 includes front-end (FE) adapters 20a to 20d being connected with a host computer, disk drives 15a to 15d, back-end (BE) adapters 23a to 23d being connected with the disk drives 15a to 15d, and network switches 22a and 22b for connecting the front-end adapters 20a to 20d and the back-end adapters 23a to 23d. The storage system 1 further includes front side cache memories 11a to 11d served as the first kind of cache memory in the front-end adapters 20a to 20d respectively. Moreover, the storage system 1 includes the back side cache memories 14a to 14d served as the second kind of cache memory, which are connected with the network switches 22a and 22b.

The third embodiment of the present invention is characterized by providing unified control units 24a to 24d for controlling the overall storage system. The unified control units 24a to 24d are connected with the network switches 22a and 22b and are logically allocated to the front-end adapters 20a to 20d, the back-end adapters 23a to 23d, and the back side cache memories 14a to 14d through the network switches 22a and 22b so that the unified control units 24a to 24d may control those components. In the third embodiment, a numeral 20 denotes the front-end adapter, which corresponds with the channel adapter of the first embodiment shown in FIG. 1. As will be discussed below, the front-end adapter is the channel adapter shown in FIG. 1 from which the processor function is removed. Hence, the component 20 is termed not the channel adapter but the front-end adapter.

In the third embodiment shown in FIG. 14, the unified control units 24a to 24d are allocated to the portions required to have more performance in the storage system, for executing the parallel processing of those portions. This parallel processing meets the required performance. On the other hand, for the portions required to have less performance, one of the unified control units 24a to 24d is responsible for the processes of two or more portions. Such a flexible using in the storage system 1 is made possible. This reduces the number of the unified control units 24a to 24d and the control capability and performance to a minimum in the storage system 1, thereby making the cost lower. In order to lower the cost, it is necessary to gather the necessary control capability in the unified control units 24a to 24d as much as possible and remove the control capability from the front-end adapters 20a to 20d and the back-end adapters 23a to 23d as much as possible, that is, make the overall storage system 1 simpler in arrangement.

FIG. 15 is a diagram showing a detailed arrangement of each of the front-end adapters 20a to 20d in the third embodiment. As shown, each of the front-end adapters 20a to 20d includes a host interface unit 220 being connected with the host computer, a command data buffer 222 for temporarily buffering data and control commands received from the host computer, a command primary control unit 223 for analyzing the control command in the command/data buffer 222, and executing the primary control in the front-end adapter, network connecting circuits 221a and 221b being connected with the network switch 22a, and a local switch 224 for connecting the command/data buffer 222, the command primary control unit 223, the network connecting circuits 221a and 221b, and the front-side cache memories 11a to 11d.

For simplifying the control, the primary command control unit 223 has only a restricted function of controlling the front side cache memories 11a to 11d. That is, the control of the front side cache memories 11a to 11d is executed only in the operation wherein the request from the host computer is a read of data, it is determined if the data is stored in the front side cache memories 11a to 11d, and if the data is stored therein, the data is sent back to the host computer. When the data is not stored in the front side cache memories 11a to 11d and need to be read out or written to the back side cache memories 14a to 14d, or when the request from the host computer is a write of data, the primary command control unit 223 notifies the unified control unit 24 allocated to the front-end adapter of the request, and then the subsequent control is sent to the unified control unit.

In addition, by enhancing the control capability of the primary command control unit 223, the primary command control unit 223 may control all processes concerning about the front-end adapter 20 and the front side cache memory 11. In this case, the processes are made complicated, so that the functional arrangement of the primary command control unit 223 is inflated correspondingly with the sophistication, thereby being an obstacle to reducing the cost.

FIG. 16 is a diagram showing an exemplary arrangement of the back-side adapters 23a to 23d to be used in the storage system according to the third embodiment of the present invention. In FIG. 16, each of the back-end adapters 23a to 23d includes a disk drive interface unit 231 being connected with the disk drives 15a to 15d, a command/data buffer 232 for temporarily storing data and control commands to be transferred with the disk drives 15a to 15d, a command/status control unit 233 for analyzing the control commands in the command/data buffer, controlling the disk drive interface circuit 231 or detecting an error status from the disk drives 15a to 15d, and then notifying the unified control units 24a to 24d of the event of error status, and network interface units 230a and 230b being connected with the network switches 22a and 22b.

In the arrangement shown in FIG. 16, the control of the overall back-end adapter and the control of the back side cache memories 14a to 14d logically connected through the network switches 22a and 22b are executed by the unified control units 24a to 24d. The function of the command/status control unit 223 in each back-end adapter is restricted to a simple control such as a lower control based on the control commands and detection of an error status from the disk drive interface unit. This makes it possible to simplify the arrangement of the back-end adapter, thereby reducing the cost of the storage system 1.

The unified control units 24a to 24d are required to provide a complicated control function and a high control capability. For example, hence, the unified control units may be realized by the processor and the software program run by the processor. FIG. 17 is a diagram showing an arrangement of the unified control unit in the third embodiment. In FIG. 17, each of the unified control units 24a to 24d includes a processor 241, a local memory 242, and network connecting circuits 244a and 244b connected with the network switches 22a and 22b respectively. The unified control unit may store in the local memory 242 a control program to be run on the processor 241 or the data structure as shown in FIGS. 5, 6, 8, 10, 11 and 12.

The operation of the storage system according to the third embodiment of the present invention shown in FIG. 14 is substantially analogous to that of the storage system according to the first embodiment shown in FIG. 1 or the second embodiment shown in FIG. 13. The data structure for control as shown in FIGS. 5, 6, 8, 10, 11 and 12 may be straight-forward applied to those embodiments by replacing the channel adapter numbers with the front-end adapter numbers and the disk adapter numbers with the back-end adapter numbers.

[Cache Memory Controlling Method 1]

Figure 18:
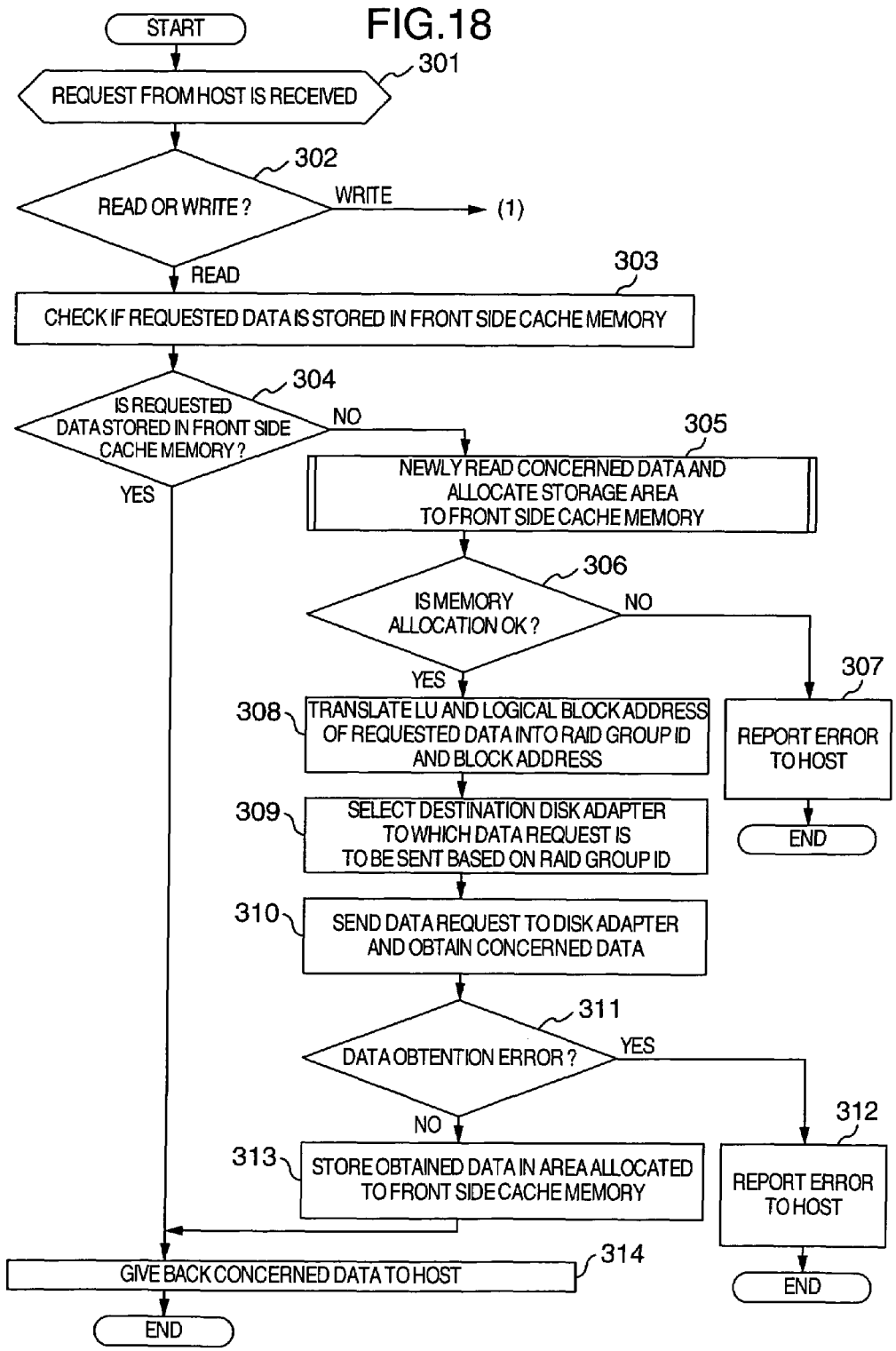
FIG. 18 is a flowchart showing a method of controlling read of data from the front side cache memory that is the first kind of cache memory, included in the cache memory controlling method 1 to be applied to the storage systems according to the first to the third embodiments of the present invention.
Figure 19:
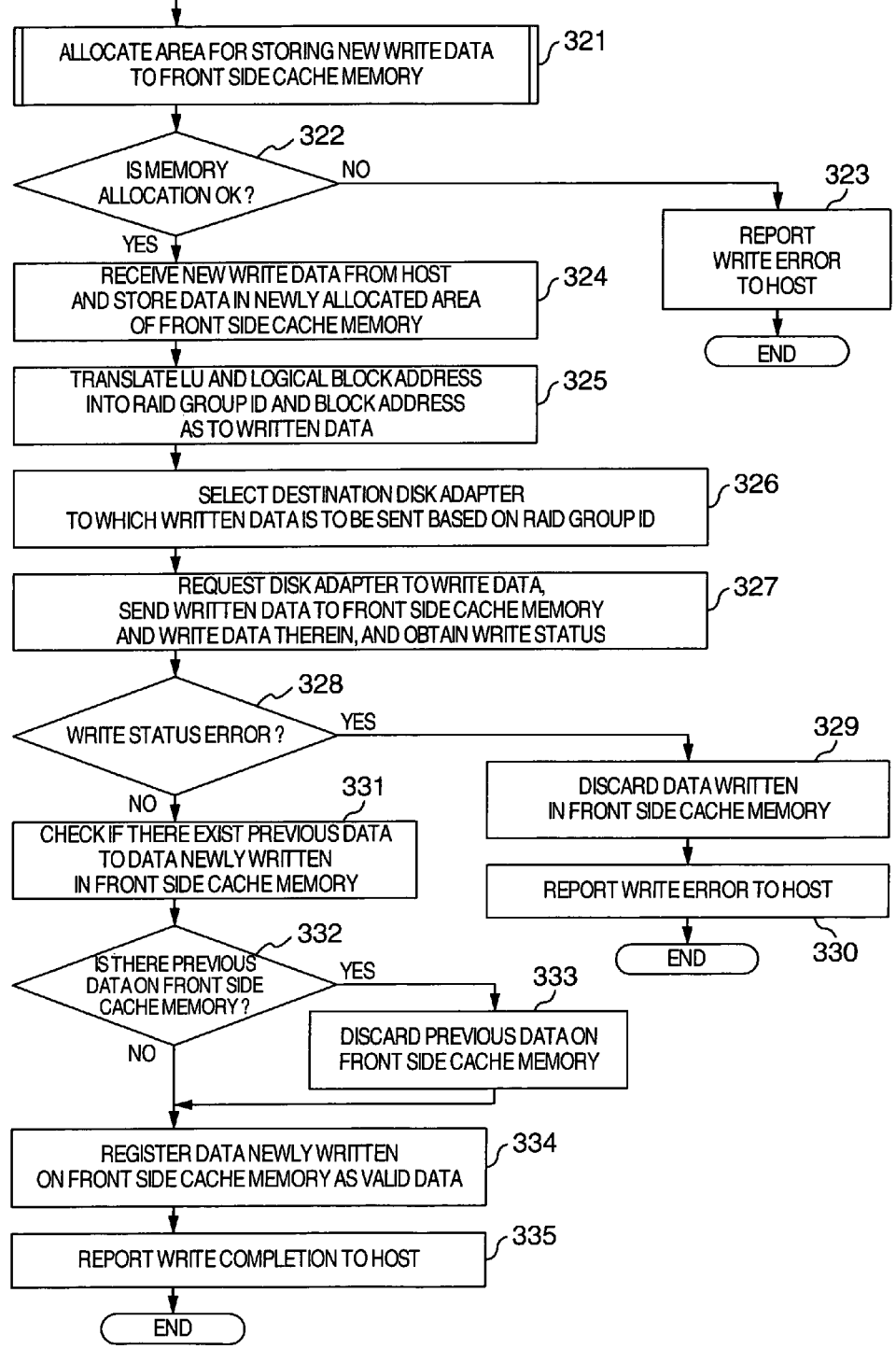
FIG. 19 is a flowchart showing a first method of controlling write of data in the front side cache memory, included in the cache memory controlling methods 1 to be applied to the storage systems according to the first to the third embodiments of the present invention.

In turn, the description will be oriented to the cache memory control to be applied to the storage system according to the first to the third embodiments of the present invention. In particular, the method of controlling an operation of reading data from the front side cache memory served as the first kind of cache memory will be described with reference to FIGS. 18 to 21. FIG. 18 is a flowchart showing a method of controlling a read of data from the front side cache memory served as the first kind of cache memory, included in the cache memory controlling method 1 to be applied to the storage system according to the first to the third embodiments of the present invention. FIG. 19 is a flowchart showing the first control method of controlling a write of data in the front side cache memory, included in the cache memory controlling method 1 to be applied to the storage system according to the first to the third embodiments of the present invention. That is, the operation flow shown in FIG. 18 corresponds with the operation to be executed if a request from the host computer is a data read, while the operation flow shown in FIG. 19 corresponds with the operation to be executed if a request from the host computer is a data write. The following cache memory control method may be commonly applied to the storage system of the first embodiment shown in FIG. 1, the second embodiment shown in FIG. 13 or the third embodiment shown in FIG. 14.

In FIG. 18, in a step 301, a request from the host computer is received. Then, in a step 302, it is determined if the request from the host computer is a request for reading data or a request for writing data. If the request from the host computer is a request for writing data, the operation is shifted to (1) in FIG. 19.

If the request from the host computer is a request for reading data, the operation goes to a step 303. In this step, the operation is executed to search the front side cache memory connected with the channel adapter or the front-end adapter having received the request from the host computer. The search result is determined in the next step 304. That is, if the requested data is stored in the searched front side cache, the operation goes to a step 314. The channel adapter (or the unified control unit for controlling the front side cache memory, which holds true to the following description) operates to send back the requested data to the host computer and then finishes the operation.

If, in the step 304, it is determined that the requested data is not stored in the front side cache memory, the operation goes to a step 305. In this step, the channel adapter operates to allocate a new storage area required for storing data in the front side cache memory. This operation will be discussed below. It is determined if the storage area is properly allocated in a step 306. If the memory allocation is failed in the front side cache memory, in a step 307, the channel adapter operates to report an error to the host computer and finishes the operation.

If the memory allocation is successful, the operation goes to a step 308. In this step, the channel adapter operates to translate the logical volume number LUN and the logical block address included in the read request from the host computer into the RAID group ID and the block address that is the management unit in the disk adapter or the back-end adapter. For this translation, the translation information represented in the data structure as shown in FIG. 5 may be used.

Then, in the step 309, by using the control information represented in the data structure as shown in FIG. 6, the channel adapter operates to specify the disk adapter or the back-end adapter (in particular, the back side cache memory) in which the read request is to be sent by the RAID group ID. In a step 310, the request for reading data is sent to the specified disk adapter or back-end adapter (in particular, the back side cache memory) so that the data requested by the host computer may be obtained.

In a step 311, it is determined if the requested data is obtained properly in the step 310. If an error takes place with respect to obtaining the data, the operation goes to a step 312. In this step, an error is reported, and the operation is terminated. If no error is determined in the step 311, the operation goes to a step 313. In this step, the data obtained from the disk adapter or the back-end adapter (in particular, the back side cache memory) is stored in the area newly allocated in the front side cache memory in the step 305. Afterwards, like the case that the concerned data has been stored in the concerned front side cache in the first place, in a step 314, the channel adapter operates to send back the concerned data on the front side cache memory to the host computer and finished the operation.

Then, if the request from the host computer is a data write, the operation shifts from the step 302 in FIG. 18 to (1) in FIG. 19. In FIG. 19, the operation goes from (1) to a step 321. Like the data read in the step 305 of FIG. 18, the channel adapter operates to allocate a new storage area for storing data on the front side cache memory. In the next step 322, it is determined if the memory allocation is successful. If the memory allocation is failed, the operation goes to a step 323, in which the write error is reported to the host computer, and the operation is terminated. If the memory allocation is successful, the operation goes to a step 324. In this step, new data to be written is received from the host computer. The new data is stored in the area on the front side cache memory allocated in the step 321.

Next, the operation goes to a step 325. Like the operation in the step 308 of FIG. 18, the channel adapter operates to translate the logical volume number LUN and the logical block address included in the write request from the host computer into the RAID group ID and the block address that are the management units in the disk adapter or the back-end adapter. In a step 326, like the operation in the step 309 of FIG. 18, the channel adapter operates to refer to the control information contained in the data structure shown in FIG. 6 and determine the disk adapter or the back-end adapter (in particular, the back side cache memory) based on the RAID group ID converted in the step 325.

In this operation, if the duplicate of the write data is executed by using two back side cache memories, the operation is also executed to determine the second disk adapter number or the second back-end adapter number being connected with the second back side cache memory. For this purpose, the control information represented in the data structure as shown in FIG. 8 is used in place of the data structure shown in FIG. 6.

In a step 327, the channel adapter operates to read and send the write data from the host computer, stored in the front side cache memory in the step 324, to the disk adapter or the back-end adapter (in particular, the back side cache memory) according to the result determined in the step 326. The write data is then written in the disk adapter or the back-end adapter. At a time, the write status for indicating if the write is executed properly should be replied back to the channel adapter. Further, if the duplicate of the write data is executed by two back side cache memories, the channel adapter operates to duplicate the write data on the front side cache memory and then send the duplicated data to the second back side cache memory. The duplicated data is then written therein. The write status is obtained and is used together with the write status for the first back side cache memory.

In a step 328, the channel adapter operates to determine the write status obtained in the step 327. If the write status indicates a write error, the operation goes to a step 329, in which step the write data stored in the front side cache memory in the step 324 is discarded and the allocated area is made to be a free area. Further, In the step 330, the channel adapter operates to report an occurrence of the write error to the host computer and finishes the operation.

If the write error status is determined to have no error in the step 328, the operation goes to a step 331, in which step the channel adapter operates to check if the previous data corresponding with the write data from the host computer stored in the step 324 is registered in the front side cache memory. Then, in a step 332, the result checked in the step 331 is determined. If the determined result indicates that the previous data to the write data is stored in the front side cache memory, the channel adapter operates to discard the previous data and put the area into a free area. Then, the operation goes to a step 334. If the previous data is not stored in the front side cache memory in the step 332, the operation directly goes to a step 334.

In the step 334, the channel adapter operates to register the write data from the host computer, stored in the front side cache memory, as the latest value of the data. Afterwards, in a step 335, the completion of the write is reported to the host computer having issued the request, and the operation is terminated.

Figure 20:
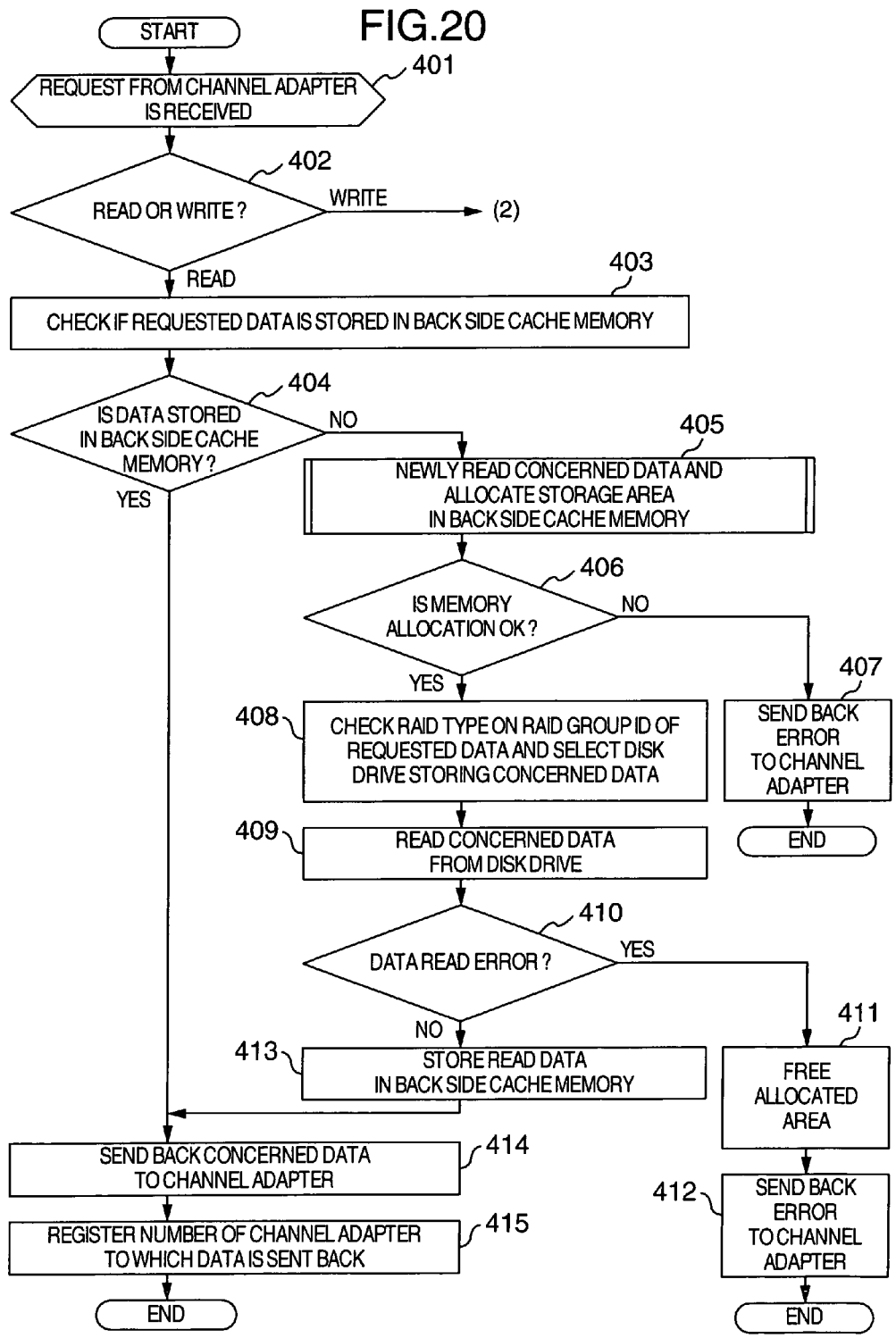
FIG. 20 is a flowchart showing a method of controlling read of data in the back side cache memory, included in the cache memory controlling method 1 to be applied to the storage systems according to the first to the third embodiments of the present invention.
Figure 21:
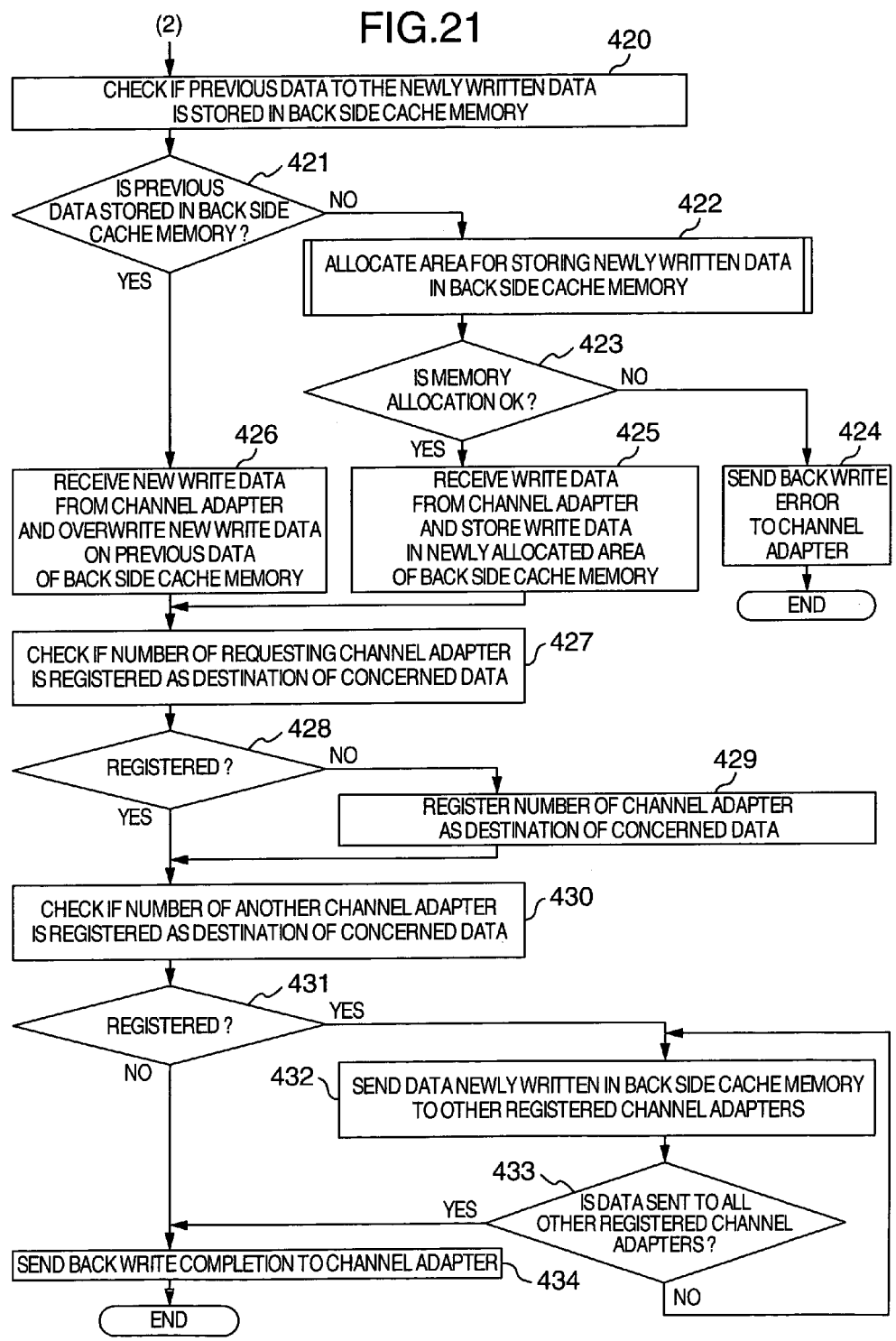
FIG. 21 is a flowchart showing a first control method of controlling write of data in the back side cache memory, included in the cache memory controlling method 1 to be applied to the storage systems according to the first to the third embodiments of the present invention.

FIG. 20 is a flowchart showing a method of controlling an operation of reading data from the back side cache memory, included in the cache memory controlling method 1 applied to the storage system according to the first to the third embodiments of the present invention. FIG. 21 is a flowchart showing a first control method of controlling an operation of writing data in the back side cache memory, included in the cache memory controlling method 1 applied to the storage system according to the first to the third embodiments of the present invention. The method shown in FIG. 20 corresponds with the method of controlling an operation of reading out data to the channel adapter (or the front-end adapter, which holds true to the following description), while the method shown in FIG. 21 corresponds with the first control method of causing the channel adapter to write the data in the back side cache memory.

In FIG. 20, at first, the disk adapter (or the unified control unit for controlling the back side cache memory, which holds true to the following description) accepts the request from the channel adapter in a step 401. Then, in a step 402, it is determined if the request is for reading or writing data. If the request is for writing data, the operation shifts to (2) in FIG. 21.

If the request from the channel adapter is for reading data, the operation goes to a step 403, in which step the disk adapter operates to check if the requested data is stored in the concerned back side cache memory. Then, in a step 404, the checked result is determined. If the checked result indicates that the requested data is stored in the concerned back side cache memory, the operation goes to a step 414. On the other hand, if the checked result indicates that the requested data is not stored in that back side cache memory, the operation goes to a step 405.

In the step 405, the disk adapter operates to allocate a new memory area for storing the requested data on the back side cache memory. This operation will be discussed below in detail. In a step 406, it is determined if the memory area is properly allocated. If the memory allocation is failed in the back side cache memory, the disk adapter operates to report an error to the channel adapter having issued the data request and finishes the operation. If the memory allocation is successful, the operation goes to a step 408. In this step 408, the disk adapter operates to check the RAID type from the RAID group ID of the requested data by referring to the control information as shown in FIG. 10 and then determine the disk drive where the requested data is stored on the basis of the checked result.

Proceeding to a step 409, the disk adapter operates to read the requested data from the disk drive. Then, in a step 410, it is determined if an error takes place in the data read from the disk drive. If an error takes place in the data read from the disk drive, in a step 411, the disk adapter operates to free the area on the back side cache memory allocated in the step 405. In a step 412, the disk adapter also operates to report an error to the channel adapter and finishes the operation.

If no error takes place in the data read from the disk drive, the disk adapter operates to store the data read in the step 413 in the area on the back side cache memory allocated in the step 405. Then, the operation goes to a step 414. In this step, the target data stored in the back side cache memory is sent back to the channel adapter having issued the request. Proceeding to the step 415, the disk adapter operates to record the channel adapter having been sent back the data as the destination of the data. The channel adapter may be recorded in the local memory of the back side cache memory, the disk adapter or the unified control unit through the use of the control information of the data structure as shown in FIG. 11.

Then, if the request from the channel adapter is for writing data, the operation goes from the step 402 in FIG. 20 to (2) in FIG. 21. In FIG. 21, the operation goes from (2) to a step 420. Like the operation of the step 403 in FIG. 20, the disk adapter operates to check if the previous data corresponding with the data to be newly written is stored in the concerned back side cache memory.

Proceeding to a step 421, the checked result is determined. If the checked result indicates that the previous data is stored in the back side cache memory, the operation goes to a step 426, in which step the disk adapter operates to overwrite the write data being transmitted from the channel adapter on the previous data. Then, the operation goes a step 427. On the other hand, in the step 421, if the checked result indicates that the previous data is not stored in the back side cache memory, the operation goes to a step 422. Like the operation of the step 405 in FIG. 20, the disk adapter operates to allocate a new area for storing the write data on the back side cache memory. In the next step 423, it is determined if the memory allocation is successful. If the memory allocation is failed, the operation goes to a step 424, in which step the disk adapter operates to report a write error to the channel adapter having issued the request and then finishes the operation.

If the result determined in the step 423 indicates the memory allocation is successful, the operation goes to a step 425. In this step, the disk adapter operates to receive the write data from the channel adapter and then store the data on the area newly allocated on the back side cache memory. Then, the operation goes to a step 427.

In the step 427, the disk adapter operates to check if the channel adapter having issued the request is registered as the destination of the data. This is realized by retrieving the data structure as shown in FIG. 11, for example. If, in a step 428, the checked result indicates that the channel adapter having issued the request has been registered as the destination of the data, the operation goes to a step 430. If the channel adapter having issued the request is not still registered as the destination of the data, the disk adapter operates to register the channel adapter as the destination of the data in the step 429. Likewise, this may be realized by adding a new entry to the control information contained in the data structure as shown in FIG. 11, for example. Then, the operation goes to a step 430.

In the step 430, the disk adapter operates to check if other channel adapters are registered as the destination of the data. This may be realized by retrieving the control information contained in the data structure as shown in FIG. 11, for example. In the step 431, the result retrieved in the step 430 is determined. If any other channel adapters are not registered, the operation goes to a step 343. If some other channel adapters are registered, the operation goes to a step 432. In this step, the disk adapter operates to send the data newly written on the back side cache memory in the step 426 or 425 to the registered channel adapter and then to update the previous data on the front side cache memories connected with the registered channel adapters.

In the step 433, the disk adapter operates to determine if the newly written data is sent to all the registered channel adapters. If there are left one or more channel adapters the data does not reach, the operation goes back to the step 432 and is repeated therefrom. If the newly written data reaches all the channel adapters registered as the destination of the data, the operation goes to a step 434. In the step 434, the disk adapter operates to report the completion of write to the channel adapter having issued request and finishes the operation.

Figure 22:
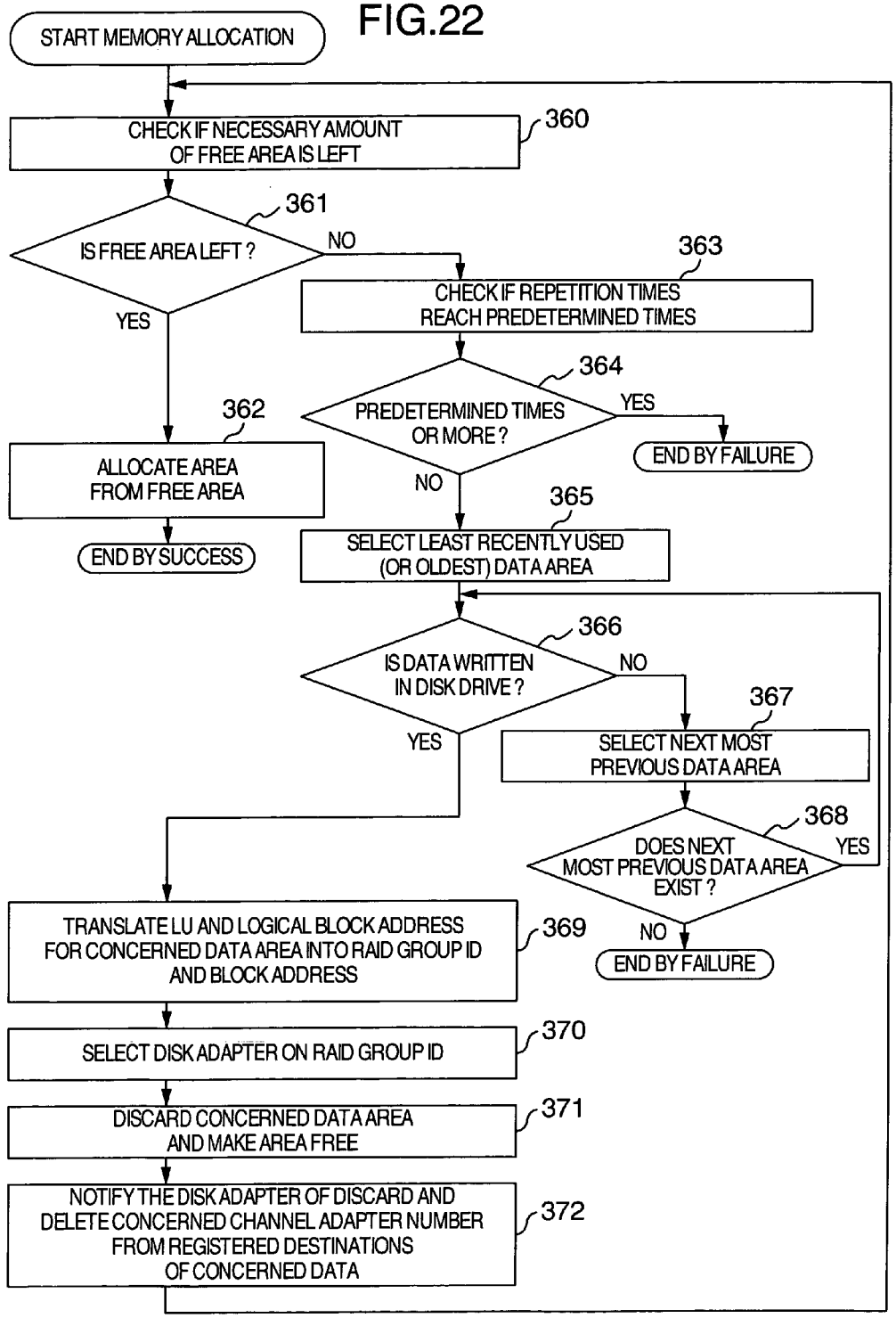
FIG. 22 is a flowchart showing a first control method of controlling allocation of the front side cache memory in the cache memory controlling method 1.

In turn, the description will be oriented to the method of allocating an area of the front side cache memory, which method is executed in the step 305 of FIG. 18 and in the step 321 of the FIG. 19. FIG. 22 is a flowchart for illustrating the first control method of allocating an area of the front side cache memory.

In FIG. 22, at first, the channel adapter operates to check if an enough free area is left on the front side cache memory in the step 360. If the checked result is determined and the required capacity of the free area is left in the step 361, the operation goes to a step 362. In this step, the necessary memory area is allocated from the free area and the memory allocation becomes successful. If the result determined in the step 361 indicates that the sufficient capacity of the free area is not left, the operation goes to a step 363.

In the step 363, the channel adapter operates to check if the repetition times are equal to or more than the predetermined constant times by counting the repetition times. That is, the operation is executed to repetitively check if the blocks to be written, obtained from the host computer, may be written in the free area. (If the data is written in the disk drive, the data stored in the front side cache can be discarded and thereby the free area is expanded. Hence, the checking operation is repeated until the free area is larger than the number of blocks to be written.) If, in the step 364, the checked result is determined as that the checking operation is repeated the predetermined times or more, the memory allocation is determined to be failed. If the repetition times of the checking operation do not reach the predetermined times, the operation goes back to the step 365. In the step 365, the least recently used (or oldest) data area on the front side cache memory is determined.

Then, in the step 366, the channel adapter operates to determine if the data on the least recently used (or oldest) data area is written back to the disk drive. This may be realized by storing the information indicating whether the data is written back to the disk drives or not in the front side cache memory through the use of the data structure as shown in FIG. 7. In the step 366, it is determined if the data is written back to the disk drives by referring to the dirty mark D of each entry in the data structure as shown in FIG. 7.

If the result determined in the step 366 indicates that the data is not still written back to the disk drive, the operation goes to a step 367, in which step the channel adapter determines the second least recently used (or second oldest) area. In a step 368, it is determined if such a data area still exists. If it exists, the operation goes back to the step 366 from which the operation is repeated. If no more such a data area is left, it indicates that the memory allocation is failed.

If the result determined in the step 366 indicates the data on that memory area has been already written back to the disk drive, the operation goes to the step 369. In the step 369, the channel adapter operates to translate the logical volume number LUN and the logical block address corresponding with the data on that memory area into the RAID group ID and the block address through the translation information of the data structure as shown in FIG. 5. Then, in a step 370, the channel adapter operates to specify the disk adapter from the RAID group ID through the use of the control information of the data structure as shown in FIG. 6.

Afterwards, in a step 371, the channel adapter operates to discard the concerned data area on the front side cache memory and thereby make the data area free. In a step 372, the operation is executed to notify the disk adapter specified in the step 370 of the discard of the concerned data area and then to delete the specified channel adapter from the registration of the data destinations in the disk adapter. Then, the operation goes back to the step 360 from which the operation is repeated.

Figure 23:
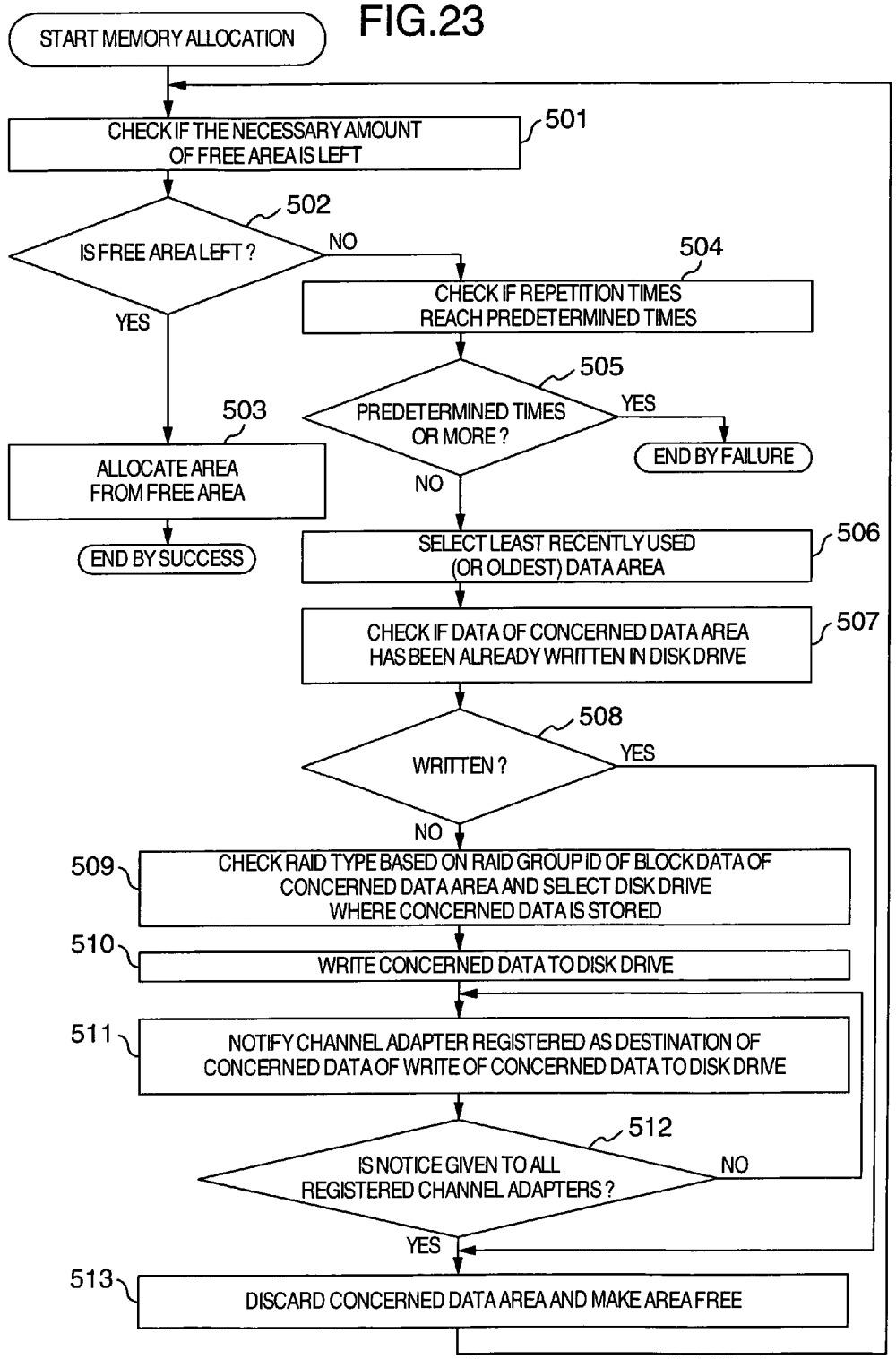
FIG. 23 is a flowchart showing a first control method of controlling allocation of the back side cache memory in the cache memory controlling method 1.

In turn, the description will be oriented to the method of allocating an area of the back side cache memory to be executed in the step 405 of FIG. 20 and in the step 422 of FIG. 21. FIG. 23 is an explanatory flowchart showing the first control method for allocating an area of the back side cache memory.

In FIG. 23, at first, the disk adapter operates to check if the necessary capacity of the free memory area is left on the concerned back side cache memory in a step 501. Then, in a step 502, the checked result is determined. If the result indicates that the necessary capacity of the free memory area is left, the operation goes to a step 503, in which step the necessary capacity of memory area is allocated to the free memory area and it is determined that the memory allocation is successful.

If the result determined in the step 502 indicates the sufficient capacity of the free area is not left, the operation goes to a step 504. In the step 504, the disk adapter operates to check if the repetition times of the operation is equal to or more than a predetermined times by counting the repetition times. In a step 505, the checked result is determined. If the operation is repeated the predetermined times or more, it is determined that the memory allocation is failed. If it is not, the operation goes to a step 506, in which step the disk adapter operates to determine the least recently used (or oldest) data area on the back side cache memory.

Then, in a step 507, the disk adapter operates to check if the data on the data area has not been already written back to the disk drive. This may be realized by storing information indicating whether the data is written back to the disk drives or not in the back side cache memory through the use of the data structure as shown in FIG. 9. In the step 507, it is checked if the data is not written back to the disk drive by referring to the dirty mark D of each entry of the data structure as shown in FIG. 9.

In a step 508, the result checked in the step 507 is determined. If the determined result indicates the data has been already written back to the disk drive, the operation goes to a step 513. If the result checked in the step 508 indicates that the data is not still written back to the disk drive, the operation goes to a step 509. Based on the RAID group ID of the data on the concerned data area, the disk adapter operates to check the RAID type through the use of the control information as shown in FIG. 10 and to select the target disk drive to which the concerned data is to be written back. Then, in a step 510, the disk adapter operates to write back the concerned data to the target disk drive.

In a step 511, the disk adapter notifies the channel adapter registered as the destination of the concerned data of the write-back of the concerned data to the disk drive. The channel adapter operates to change the dirty mark D contained in the data structure as shown in FIG. 7 into the "written" mark. In a step 512, it is determined if the write-back of the data is notified to all the channel adapters registered as the destination of the concerned data. If it is not notified to all the channel adapters, the operation goes back to a step 511 from which the operation is repeated.

After the disk adapter notifies all the channel adapters registered as the destination of the concerned data of the write-back of the data, the operation goes to a step 513. In the step 513, the disk adapter operates to discard the concerned data area on the back side cache memory and make the area free. Afterwards, going back to the step 501, the overall process is repeated. Further, the write (write-back) of the data from the back side cache memory to the disk drive, executed in the disk adapter, is realized on the occasion of not only the memory allocation on the back side cache memory as shown in FIG. 23 but also on the occasion when the passing time from the data is written in the back side cache memory reaches some specific time, or when the remaining capacity of the free area in the back side cache memory.

Figure 24:
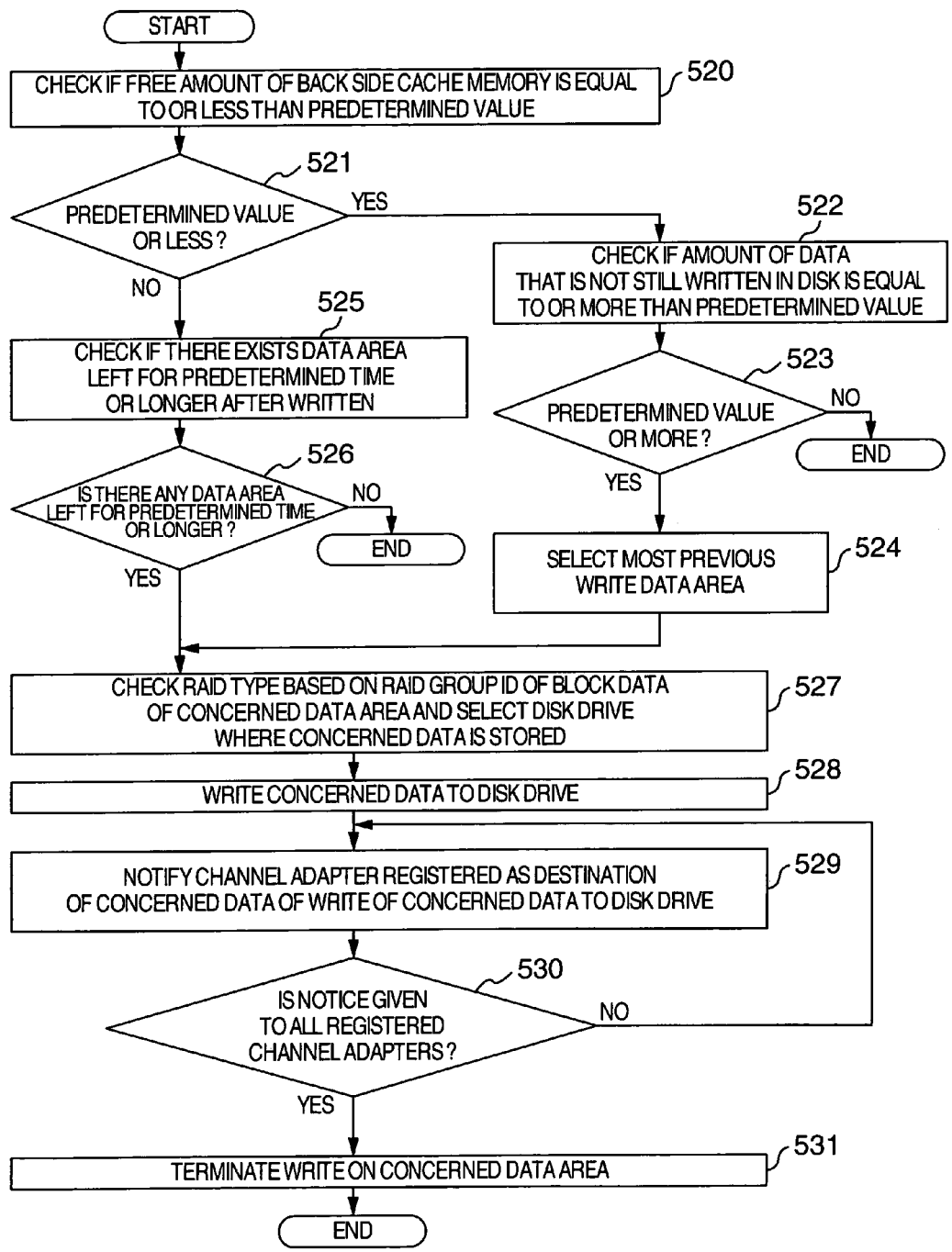
FIG. 24 is a flowchart showing a first control method of controlling write-back (write) of data written in the back side cache memory into the disk drive, included in the cache memory controlling method 1.

FIG. 24 is an explanatory flowchart showing the foregoing first control method of writing data in the back side cache memory. That is, FIG. 24 is a flowchart showing the first control method of controlling the write (write-back) of the data written in the back side cache memory by the first present control method.

In FIG. 24, the disk adapter operates to check if the remaining capacity (free capacity) of the free area in the back side cache memory is equal to or more than the predetermined capacity. The result is determined in a step 521. If the free capacity is not enough, the operation goes to a step 522. In this step 522, it is checked if the amount of the data that is not still written back to the disk drive is equal to or more than the predetermined value. In a step 523, the disk adapter determines the checked result. If the amount of the data that is not still written back to the disk drive is less than the predetermined value, the operation is terminated. On the other hand, if the amount of the data that is not still written back to the disk drive is equal to or more than the predetermined value, the operation goes to a step 524. In this step, the disk adapter operates to determine the oldest area of the data that is not still written back to the disk drive. Then, the operation goes to a step 527.

Further, if the determination in the step 521 indicates that the free capacity of the back side cache memory is equal to or more than the predetermined capacity, the operation goes to a step 525. In this step, the disk adapter operates to check if the back side cache memory includes a data area left a predetermined time or longer after the data is written in the back side cache memory without writing back the data to the disk drives. The checked result is determined in the step 526. If there exists no data area left for a predetermined time or longer, the disk adapter finishes its operation.

If the result checked in the step 526 indicates the data area is left for the predetermined time or longer, the operation goes to a step 527. In this step 527, like the step 509 in FIG. 23, the disk adapter operates to check if the RAID type about the data area of the oldest data determined in the step 524 or the data area of the written data passed a predetermined time or longer, based on the RAID group ID of the concerned data and then to select the target disk drive to which the concerned data is to be written back. Then, in a step 528, the concerned data is written back to the disk drive.

Afterwards, in a step 529, the disk adapter operates to notify the channel adapter registered as the destination of the concerned data of the write-back of the concerned data to the disk drive and to change the dirty mark D contained in the data structure as shown in FIG. 7 into the "written" mark. In a step 530, the disk adapter operates to determine if the write-back of the data is notified to all the channel adapters registered as the destination of the concerned data. If not, the operation goes back to the step 529 from which the operation is repeated.

After the disk adapter notifies all the channel adapters registered as the destination of the concerned data of the write-back of the concerned data, the operation goes to a step 531. In this step, the dirty mark D of the concerned data area in the data structure as shown in FIG. 9 located on the back side cache memory is changed into the "written-back" mark in order to indicate the concerned data has been written. Then, the operation is terminated.

[Cache Memory Controlling Method 2]

In turn, the description will be oriented to the second control method of controlling the write of the data in the back side cache memory, included in the cache memory controlling method 2 applied to the storage system according to the first to the third embodiments of the present invention. The second control method will be described below with reference to FIG. 25.

In the method of controlling the write of the data in the back side cache memory of the foregoing cache memory controlling method 1, when the data is written from the host computer, after the write data is written in the back side cache memory by the channel adapter having received the write request, if the previous data to the concerned write data is stored in the other front side cache memories of other channel adapters, the newly written data is sent from the back side cache memory to the other front side cache memories having the previous data to the concerned write data, for updating the overall previous data to the concerned write data (see FIG. 21). This type of control method is quite effective, when the concerned data area is frequently accessed by the host computers connected with the other channel adapters because the latest data is constantly sent to all the front side cache memories.

However, in a case that the concerned data is not so frequently accessed by the other channel adapters or almost of the accesses are write access even if frequently accessed, the sending of the latest data to all the front side cache memories and the update thereof every time the data is newly written disadvantageously results in consuming the communication capability between the back side cache memory and the front side cache memory and wasting the area of the front side cache memory, thereby impairing the effectiveness of the overall system.

In the abovementioned case, hence, it is possible to only discard the previous data on the other front side cache memories so that the previous data should not be used each time when the write takes place without constantly sending the latest data to all the front side cache memories. In this case, the channel adapters being connected with the other front side cache memories operate to refer to the back side cache memory on another occasion when the concerned data is accessed again through each one of the channel adapters itself from the host computer and then to read the latest data from the back side cache memory.

Figure 25:
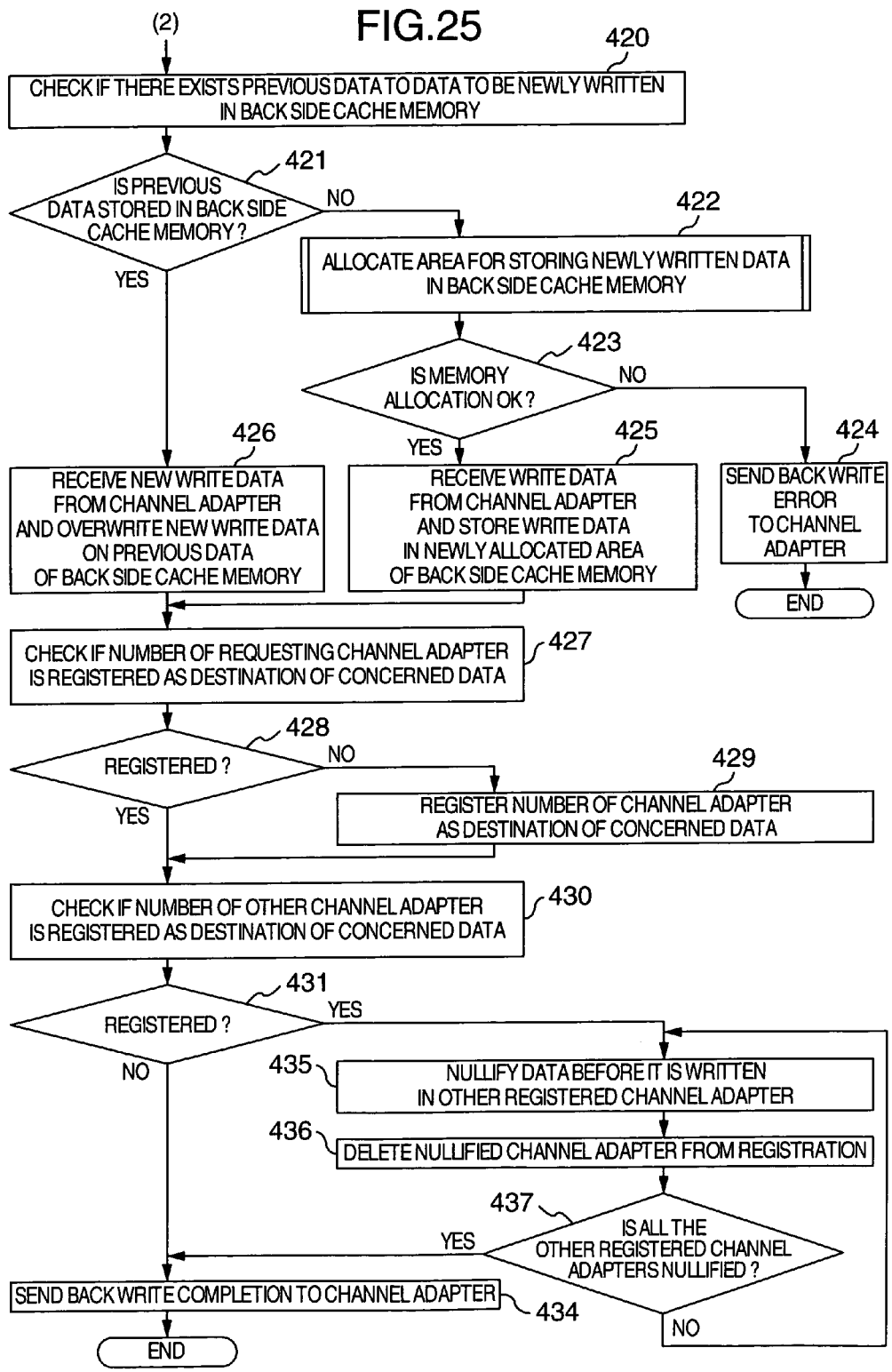
FIG. 25 is a flowchart showing a second control method of controlling write of data in the back side cache memory, included in the cache memory controlling method 2.

FIG. 25 is a flowchart showing the different second control method from the first control method shown in FIG. 21, for the purpose of executing the foregoing control for writing data from the back side cache memory. In the second control method for the back side cache memory (the cache memory controlling method 2) shown in FIG. 25, the receipt and the determination of the request from the channel adapter and the control method to be executed when the request is for reading data are the same as those of the foregoing control method shown in FIG. 20. That is, the request is received from the channel adapter and if the request is for reading data, the same control as that shown in FIG. 20 is executed. If the request is for writing data, the operation goes from (2) of FIG. 20 to (2) of FIG. 25.

In FIG. 25, the control from the steps 420 to 431 is the same as the control method of the foregoing first cache memory control method shown in FIG. 21. Herein, hence, the operation of the step 431 or later will be described below.

In the step 431, the disk adapter operates to determine if the other channel adapters rather than the channel adapter having issued the write request are registered as the destination of the concerned data. If the determined result indicates any other channel adapters are not registered, like the operation of FIG. 21, the operation goes to a step 434. If the determined result indicates some other channel adapters are registered, the operation goes to a step 435. In this step, the disk adapter operates to notify the other registered channel adapters of the data write on the concerned data area, causes the channel adapters to discard the previous data to the concerned written data on the front side cache memory being connected with each of the channel adapters itself, and then nullify the previous data of the each channel adapter.

Proceeding to a step 436, the disk adapter operates to delete the channel adapters which discard the previous data from the registered destination where the concerned data is to be sent. Afterwards, in a step 437, it is determined if the previous data is nullified with respect to all the other channel adapters registered as the destination of the concerned data. If there are left any other channel adapters that does not nullify the data, the operation goes back to a step 435 from which the operation is repeated.

If, in the step 437, it is determined if the nullification of the concerned data of the front side cache memory connected with every other channel adapter is completed, the operation goes to a step 434. In this step, the disk adapter operates to report the completion of the data write to the channel adapter having issued the write request and then finishes the operation.

In the second control method for the back side cache memory (the second cache memory control method) shown in FIG. 25, the control for reading and writing data from and to another front side cache memory is the same as that of the foregoing method shown in FIGS. 18 and 19. The control methods for allocation of the front side cache memory, allocation of the back side cache memory, and write-back of the data of the back side cache memory to the disk drive are the same as those of the methods shown in FIGS. 22, 23 and 24.

[Cache Memory Controlling Method 3]

In turn, the description will be oriented to the second control method for controlling the write of data in the front side cache memory in the cache memory controlling method 3 to be applied to the storage systems according to the first to the third embodiments of the present invention. The second control method will be described with reference to FIG. 26.

In the foregoing cache memory controlling method 1 and cache memory controlling method 2 in the method for controlling the cache memory of the storage system, when data is written from the host computer, the duplicate of the write data for improving the reliability is executed by using the front side cache memory and the back side cache memory. In those two methods, the write data on the front side cache memory sent from the host computer cannot be discarded until the same data is written back from the back side cache memory to the disk drive. This may thus suppress the capacity of the front side cache memory.

Figure 26:
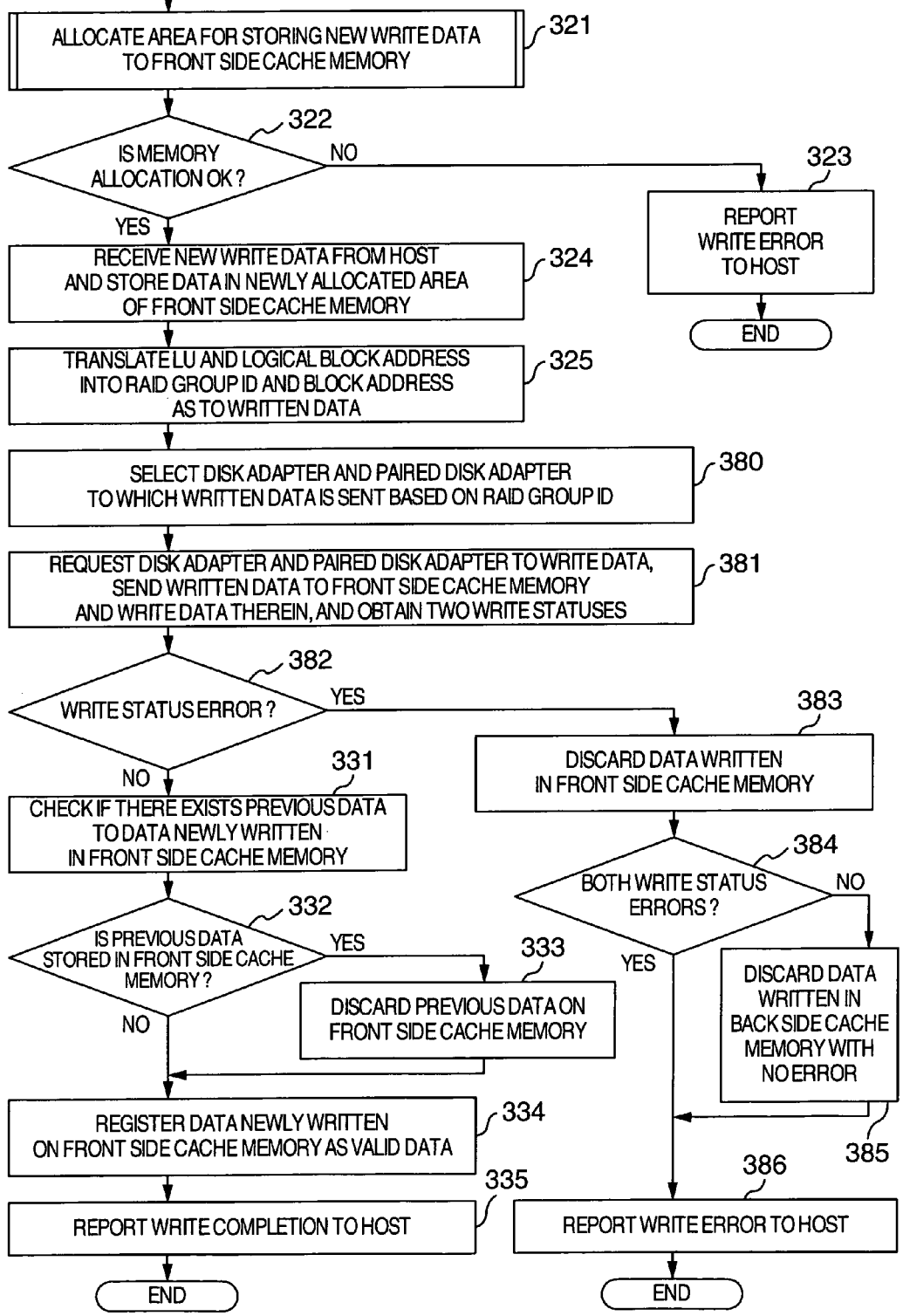
FIG. 26 is a flowchart showing a second control method of controlling write of data in the front side cache memory, included in the cache memory controlling method 3 applied to the storage systems according to the first to the third embodiments of the present invention.

In order to overcome the suppression, the control method for the cache memory shown in FIG. 26 is executed to duplicate the write data by using two back side cache memories. In this control method, though the capacity of the back side cache memory is doubled about the write data, the data stored in the front side cache is discarded if necessary and the data area may be reused irrespective of the write-back of the data from the back side cache memory to the disk drive.

FIG. 26 is a flowchart showing the second control method for controlling the write of data in the front side cache memory of the storage system according to the present invention. In the control method of this cache memory controlling method 3, the control method to be executed in a case that the request from the host computer is for determining a receipt from the host computer or reading data is the same as the method shown in FIG. 18 included in the foregoing cache memory controlling method 1. That is, if the request is received from the host computer and the request is for reading data, the same control as that shown in FIG. 18 is executed. If the request is for writing data, the operation goes from (1) of FIG. 18 to (2) of FIG. 26. In FIG. 26, the control from the steps 321 to 325 is the same as the control of the foregoing method shown in FIG. 19. Hence, as to the control method of the cache memory controlling method 3, the operation of the step 325 or later will be described below.

In the step 325 of FIG. 26, like the foregoing cache memory controlling method 1 shown in FIG. 19, the channel adapter operates to translate the logical volume number LUN and the logical block address into the RAID group ID and the block address. Proceeding to a step 380, the channel adapter operates to specify the second disk adapter to be paired with the first disk adapter to which the written data is to be sent, based on the RAID group ID. This may be realized by using the control information composed of the data structure as shown in FIG. 8, for example.

Then, in a step 381, the channel adapter operates to issue a request for writing data to the disk adapter and the paired second disk adapter, send to these disk adapters the write data from the host computer which is written in the front side cache memory, cause these disk adapters to write the data in their back side cache memories, and then obtain the corresponding write statuses from these disk adapters. Thus, the number of the write statues is totally two. In a step 382, the channel adapter operates to determine if both of the two write statuses have an error or not. If the determined result indicates either of them has an error, the operation goes to a step 383, in which step the write data from the host computer is discarded from the front side cache. Proceeding to a step 384, it is determined if both of these two write statuses have no error. If both have an error, the operation goes to a step 386.

In a step 384, if either of these write statues has no error, the operation goes to the step 385. In this step, the channel adapter operates to notify the disk adapter with no error of the cancellation of the data write and cause the disk adapter to discard the written data. If the written data cancelled in this back side cache memory causes the concerned channel adapter to be registered as the destination to which the concerned data is to be sent, the registration is cancelled as well. Afterwards, the operation goes to the step 386. In this step, the channel adapter reports the write error to the host computer and then finishes the operation.

In the step 382, if both of these two write statues have no error, the control method of the step 331 or later is the same as the control method of the step 331 or later shown in FIG. 19.

In turn, the description will be oriented to the method of controlling the back side cache memory in the cache memory controlling method 3. In the back side cache memory control method, the method of controlling the first back side cache memory is the same as the process shown in FIGS. 20 and 21 in the foregoing cache memory controlling method 1 or the process shown in FIG. 25 in the foregoing cache memory controlling method 2. Herein, hence, the method of controlling the second back side cache memory that is dedicated to writing data.

Figure 27:
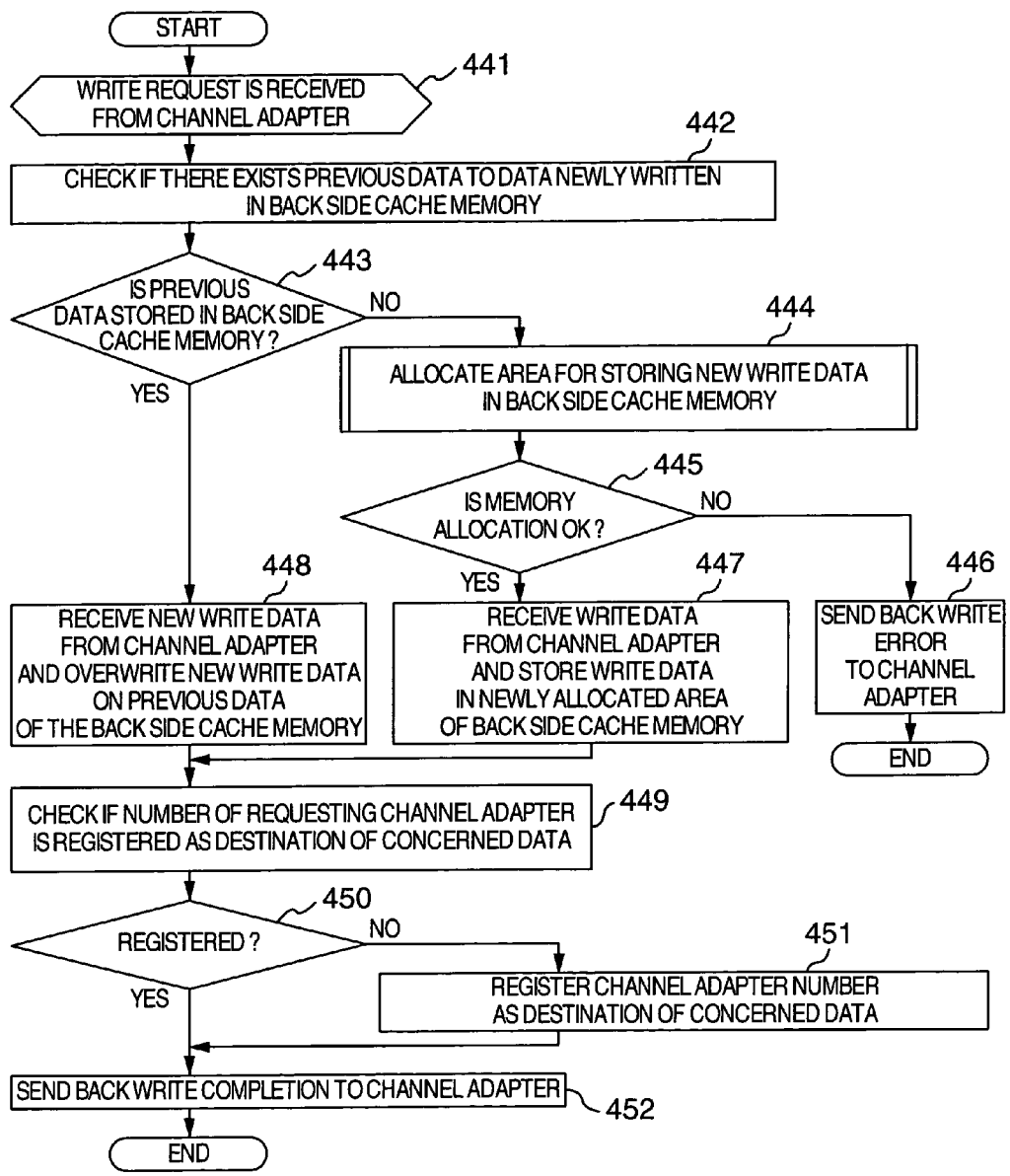
FIG. 27 is a flowchart showing a control method of controlling write of data in the second back side cache memory, included in the cache memory controlling method 3.

FIG. 27 is an explanatory flowchart showing the method of controlling the second back side cache memory that is dedicated to duplicate data. In FIG. 27, at first, the second disk adapter receives a write request from the channel adapter in a step 441. Then, in a step 442, the disk adapter operates to check if the previous data for the data to be newly written is stored in the back side cache memory thereof.

Proceeding to a step 443, the checked result is determined. If the checked result indicates the previous data is stored in the back side cache memory, the operation goes to a step 448. In this step, the write data to be sent from the channel adapter is overwritten on the previous data. Then, the operation goes to a step 449. In the step 443, if the checked result indicates that the previous data is not stored in the back side cache memory, the operation goes to a step 444, in which step the disk adapter operates to allocate a new area for storing the write data onto the back side cache memory.

In the next step 445, it is determined if the memory allocation is successful. If it is failed, the operation goes to a step 446. In this step, the disk adapter operates to report a write error to the channel adapter having issued the request and then finishes the operation. If the result determined in the step 445 indicates the memory allocation is successful, the operation goes to a step 447. In this step, the disk adapter operates to receive the write data from the channel adapter and then store the write data in the area newly allocated on the back side cache memory. Afterwards, the operation goes to a step 449. In this step, the disk adapter operates to check if the channel adapter having issued the request is registered as the destination to which the concerned data is to be sent. This may be realized by retrieving the data structure as shown in FIG. 11, for example.

Proceeding to a step 450, the result retrieved in the step 449 is determined. If the result indicates that the channel adapter having issued the request has been already registered as the destination to which the concerned data is to be sent, the operation goes to a step 452. If the channel adapter having issued the request is not still registered as the destination to which the concerned data is to be sent, the disk adapter operates to register the channel adapter as the destination in the step 451. This may be also realized by adding an entry of the control information in the data structure as shown in FIG. 11, for example. Afterwards, the operation goes to the step 452. In this step, the disk adapter operates to report the channel adapter having issued the request of the completion of the write and then finishes the operation.

In this step, unlike the control method for the first back side cache memory as shown in FIG. 21 or 25, the control for the second back side cache memory shown in FIG. 27 does not require the disk adapter to notify the other channel adapter of the concerned data of the new write. The notice of the new write to the other channel adapters having the previous data to the concerned write data is executed by the first disk adapter connected with the first back side cache memory in the control method shown in FIG. 21 or 25. The control for registering the channel adapter having issued the request as the destination to which the concerned data is to be sent in the step 451 is executed so that when the first back side cache memory is disabled by failure, the second disk adapter can take over the process of the disabled memory.

In the cache memory controlling method 3, the control method for allocating an area of the front-end cache memory and the control method for allocating an area of the back-end cache memory are somewhat different from the control method shown in FIGS. 22 and 23 included in the foregoing cache memory controlling method 1. Concretely, the reuse of the area of the front-side cache memory may be executed irrespective of the write (write-back) of data from the back side cache memory to the disk drive, one channel adapter may be controlled in association with the two disk adapters, and the two disk adapters are controlled in association with each other.

Figure 28:
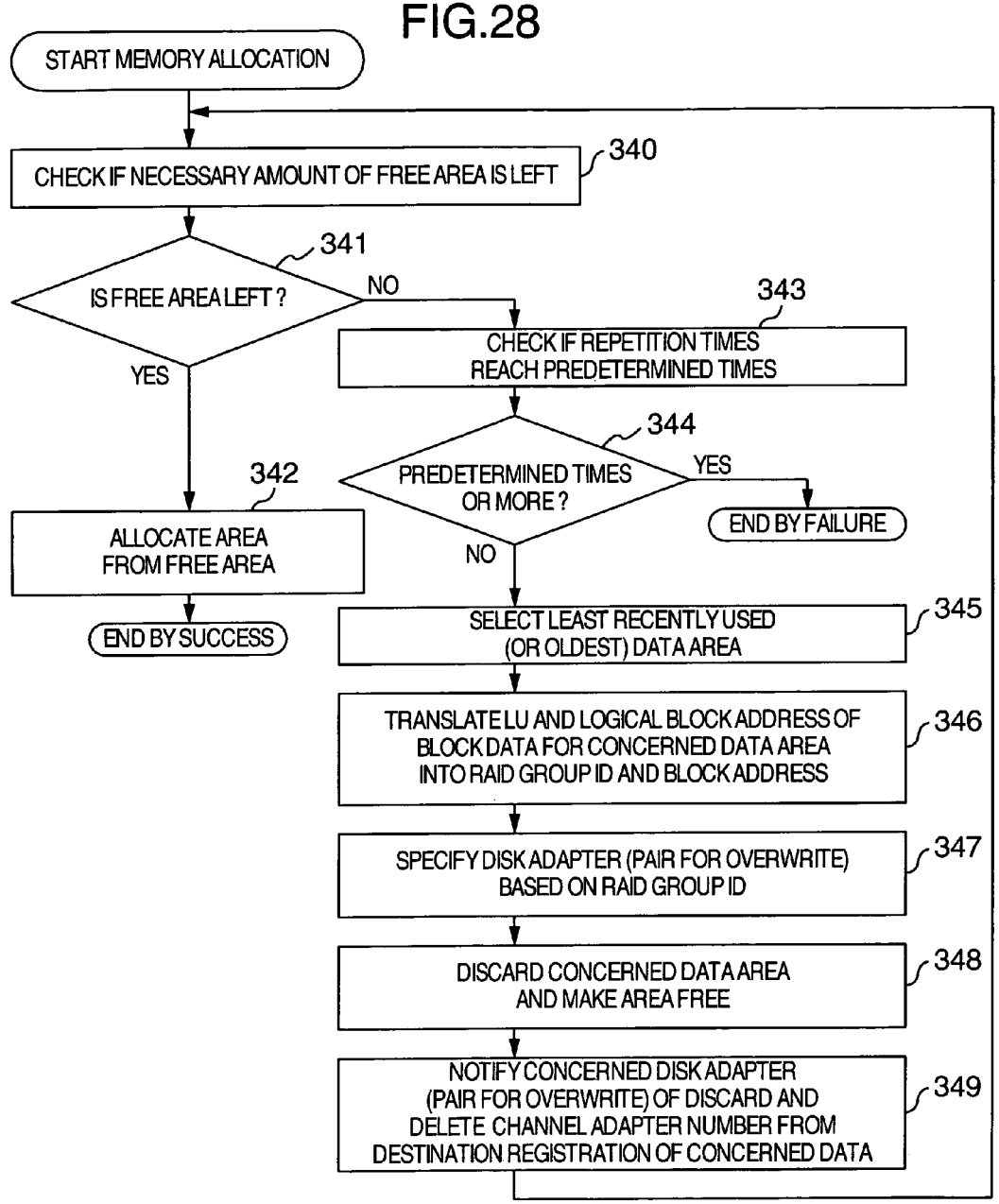
FIG. 28 is a flowchart showing a second control method of controlling allocation of the front side cache memory, included in the cache memory controlling method 3.

FIG. 28 is a flowchart showing the second control method for controlling allocation of the front side cache memory in the cache memory controlling method 3 according to the storage system of the present invention. The process of FIG. 28 may be replaced with the process of FIG. 22 in the foregoing cache memory controlling method 1. In FIG. 28, at first, in a step 340, the channel adapter operates to check if the necessary capacity is left on the free area on the front side cache memory. In the next step 341, the checked result is determined, If it is left, the operation goes to a step 342, in which step the necessary capacity of the free memory area is allocated to the front side cache memory and it is determined that the memory allocation becomes successful.

If the result determined in the step 341 indicates the necessary capacity is not left on the free memory area, the operation goes to a step 343. In this step, the channel adapter operates to check if the operation is repeated the predetermined times or more by counting the repetition times. The checked result is determined in the step 344. If the result indicates that the operation is repeated the predetermined times or more, it is determined that the memory allocation is failed. If the result indicates that the repetition times of the operation do not reach the predetermined times, the operation goes to a step 345, in which step the channel adapter operates to determine the least recently used (or oldest) data on the front side cache memory.

Then, in a step 346, the channel adapter operates to translate the logical volume number LUM and the logical block address for the data of the concerned data area into the RAID group ID and the block address through the use of the translation information in the data structure as shown in FIG. 5. Proceeding to a step 347, based on the RAID group ID, the channel adapter operates to specify the first disk adapter and the second paired disk adapter through the use of the control information in the data structure as shown in FIG. 8.

Afterwards, in a step 348, the channel adapter operates to discard the concerned data area on the front side cache memory and then put the data area into the free area. In the next step 349, the channel adapter operates to notify the disk adapter and the paired disk adapter specified in the step 347 of the discard of the concerned data area for the two disk adapters to delete the concerned channel adapter from their registrations of the destinations to which these disk adapters send the concerned data. Then, going back to the step 340, the overall process is repeated.

Figure 29:
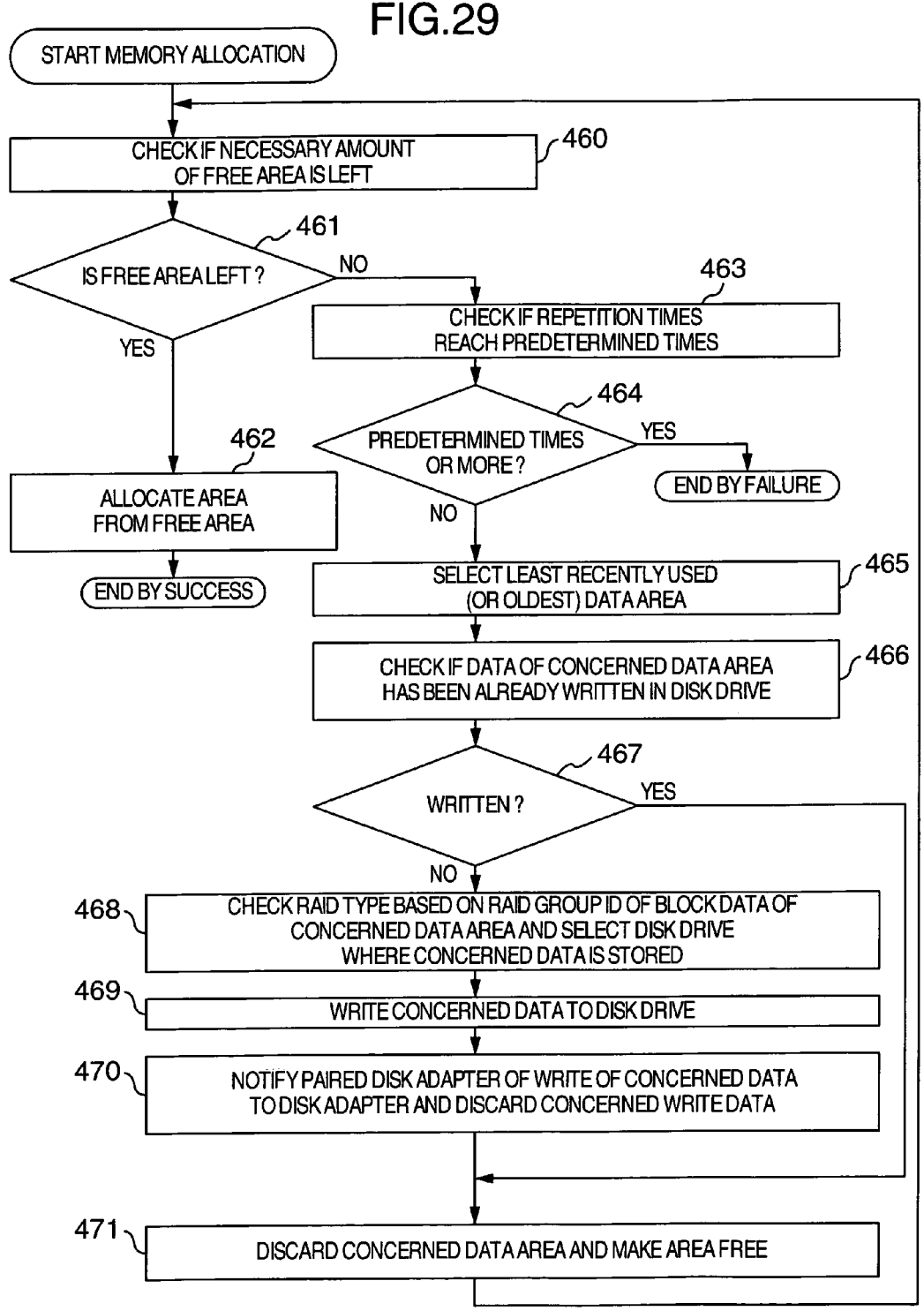
FIG. 29 is a flowchart showing a second control method of controlling allocation of the back side cache memory, included in the cache memory controlling method 3.

In turn, the description will be oriented to the method for allocating an area of the back side cache memory to be executed in the step 405 of FIG. 20 and in the step 422 of FIG. 21. FIG. 29 is a flowchart showing the second control method for controlling allocation of the back side cache memory in the cache memory controlling method 3 in the storage system according to the present invention, which may be replaced with the first cache memory control method shown in FIG. 23. In addition, the method for controlling allocation of the back side cache memory to be discussed in FIG. 29 will be applied to only the first back side cache memory.

The allocation of the second back side cache memory in the step 444 of FIG. 27 is executed simply by allocating the necessary capacity of the free area. Further, the first back side cache memory and the second back side cache memory may be exchanged in role with each other if the management unit (RAID group ID) of the data is different. This is for averaging the load burdened to the back side cache memories. At this time, the method for controlling allocation of the back side cache memory to be discussed with respect to FIG. 29 will be applied merely to the data area where the concerned back side cache memory is served as the first back side cache memory.

In FIG. 29, the disk adapter operates to check if the necessary capacity is left on the free area of the concerned back side cache memory. In a step 461, the checked result is determined. If the checked result indicates the necessary capacity is left on the free area, the operation goes to a step 462, in which step the necessary capacity of the free area is allocated to the back-end cache memory and it is determined that the memory allocation becomes successful. If the checked result in the step 461 indicates the free area is not sufficient, the operation goes to a step 463.

In the step 463, the disk adapter operates to check if the operation is repeated the predetermined times or more by counting the repetition times of the operation. In the next step 464, the checked results is determined. If the result indicates that the operation has been repeated the predetermined times or more, it is determined that the memory allocation is failed. If the result indicates that the repetition times of the operation do not reach the predetermined times, the operation goes to a step 465, in which step the disk adapter determines the least recently used (or oldest) data on the concerned back side cache memory.

Then, in a step 466, the disk adapter operates to check if the data on the data area has been written back to the disk drive. This may be realized by storing the information indicating whether the data is written back to the disk drives or not in the back side cache memory through the use of the data structure as shown in FIG. 9. In the step 466, by referring to the dirty mark D of each entry in the data structure as shown in FIG. 9, it is checked if the data has been written back to the disk drive.

The result checked in the step 466 is determined in a step 467. If the determined result indicates that the data has been written back to the disk drive, the operation goes to a step 471. If the determined result indicates that the data is not still written back to the disk drive, the operation goes to a step 468. In this step, the disk adapter operates to check the RAID type through the use of the control information as shown in FIG. 10, based on the RAID group ID of the data on the concerned data area, and select the target disk drive to which the concerned data is to be written back. Then, in a step 469, the concerned data is written back to the disk.

In a step 470, then, the disk adapter operates to notify the registered disk adapter being connected with the second back side cache memory of the write-back of the concerned data to the disk drive, discard the write data, and make the data area free. This retrieval of the second disk adapter is executed by retrieving the control information entered in the data structure shown in FIG. 21. Then, in a step 471, the disk adapter operates to discard the concerned data area on the back side cache memory and to make the area free. Afterwards, the operation goes back to the step 460 from which the overall process is repeated.

Figure 30:
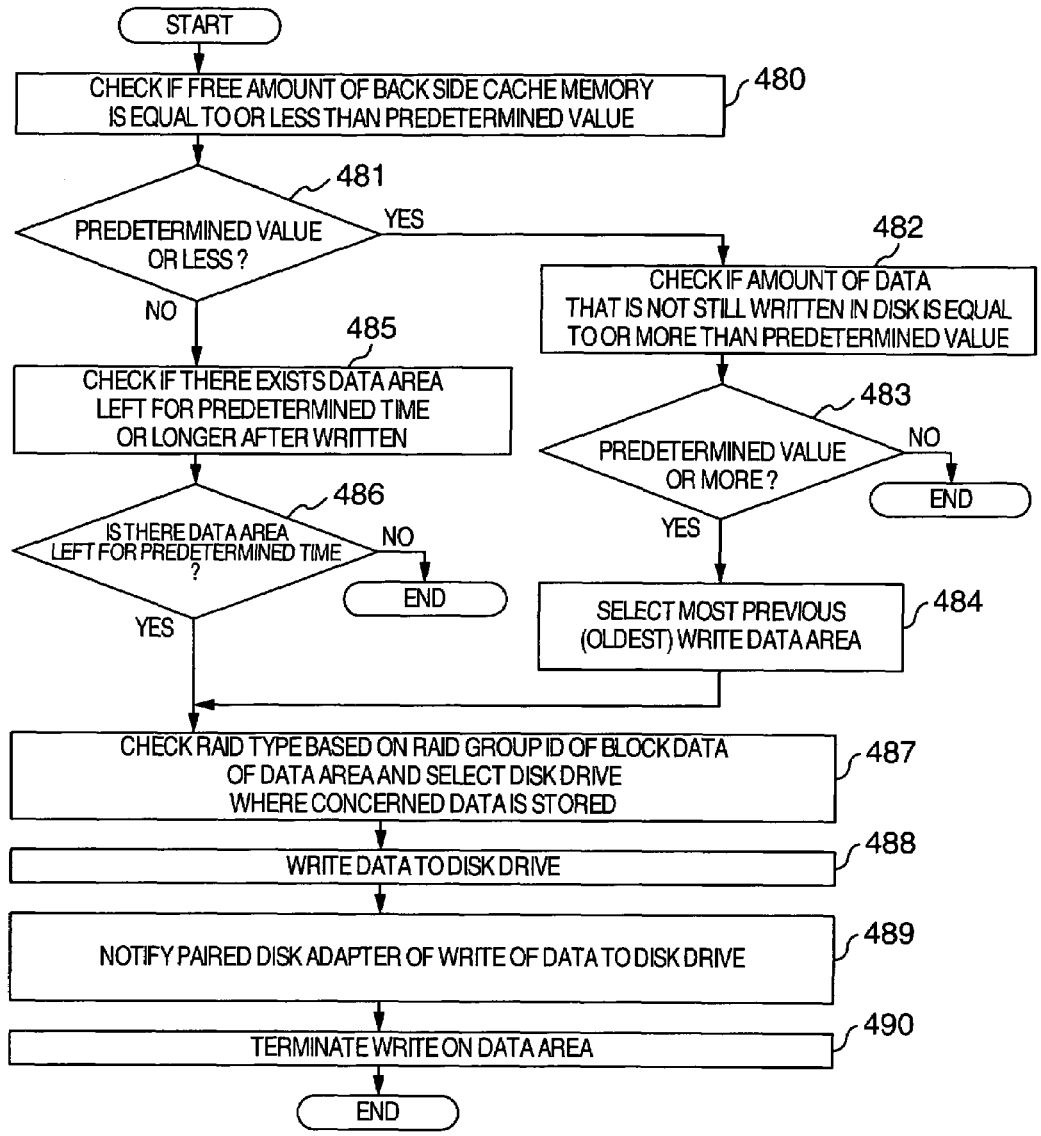
FIG. 30 is a flowchart showing a second control method of controlling write-back of data written in the back side cache memory into the disk drive, included in the cache memory controlling method 3.

FIG. 30 is a flowchart showing a second control method of controlling a write-back of write data on the back side cache memory into the disk drive in the cache memory controlling method 3 executed in the storage system according to the present invention. This second control method may be replaced with the control method shown in FIG. 24 in the cache memory controlling method 1. As shown in FIG. 30, the method of controlling a write-back of data is slightly different from the method shown in FIG. 24 included in the cache memory controlling method 1. The two disk adapters are controlled in association with each other.

In FIG. 30, at first, in a step 480, the disk adapter operates to check if the remaining capacity (free capacity) of the free area of the back side back cache memory is equal to or less than the predetermined value. In a step 481, the result is determined. If the free capacity is not sufficient, the operation goes to a step 482. In this step, it is checked if the volume of the data that is not written back to the disk drive is equal to or more than the predetermined value. In a step 483, the checked result is determined. If the checked result indicates that the volume of the data that is not written back to the disk drive is equal to or less than the predetermined value, the operation is terminated. On the other hand, if the checked result indicates that the volume of the data that is not written back to the disk drive is equal to or more than the predetermined value, the operation goes to a step 484. In this step, the disk adapter operates to determine the area of the oldest data that is not still written back to the disk drive. Then, the operation goes to a step 487.

Further, if the result determined in the step 481 indicates that the free capacity of the back side cache memory is equal to or more than the predetermined value, the operation goes to a step 485. In this step, the disk adapter operates to check if any data area is left a predetermined time or longer after the data that is not still written back to the disk drive is written on the back side cache memory. The checked result is determined in a step 486. If no data area is left a predetermined time or longer, the operation is terminated.

If the result determined in the step 486 indicates that any data area is left for a predetermined time or longer, the operation goes to a step 487. In this step, the disk adapter operates to check the RAID type of the data area of the oldest written data determined in the step 484 or the data area of the written data left for a predetermined time or longer, through the use of the control information as shown in FIG. 10, based on the RAID group ID of the concerned data, and then to select the target disk drive to which the concerned data is to be written back.

Proceeding to a step 488, the disk adapter operates to write back the concerned data to the disk. Afterwards, in a step 489, the disk adapter also operates to notify the disk adapter registered as being connected with the second back side cache memory of the concerned data of the write-back of the concerned data to the disk drive, causes the disk adapter to discard the concerned write data, and make the data area free. Like the step 470 of FIG. 29, this retrieval of the second disk adapter may be realized by retrieving the control information entered in the data structure as shown in FIG. 12. Lastly, proceeding to a step 490, the disk adapter operates to indicate the completion of writing the concerned data by changing the dirty mark D of the concerned data area of the back side cache memory in the data structure as shown in FIG. 9 into the "written-back" mark, and finishes the operation.

[Cache Memory Controlling Method 4]

In the foregoing first cache memory control method included in the cache memory control method to be applied to the storage system according to the first to the third embodiments of the present invention, though the data written from the host computer to the front-side cache memory is written in the back side cache memory, the write data area on the front side cache memory cannot be reused until the write data is written back from the back side cache memory to the disk drive. This holds true to the storage of the write data to plural front side cache memories. However, this control is originally dedicated to duplicating the write data in the front side cache memory and the back side cache memory. If the write data is stored in plural front side cache memories, the concerned write data may be held in only one of the front side cache memories until the concerned write data is written back from the back side cache memory to the disk drive.

In the cache memory controlling method 4 to be applied to the storage system according to the first to the third embodiments of the present invention, all the front side cache memories are not required to hold the write data.

In the cache memory controlling method 4, at first, when registering the destination channel adapter to which data is to be sent per each piece of data, a mark is given to the latest data-written channel adapter. FIG. 31 is a view showing the data structure of the control information to be replaced with the data structure shown in FIG. 11 used in the foregoing cache memory controlling method 1.

Figures 17, 31:
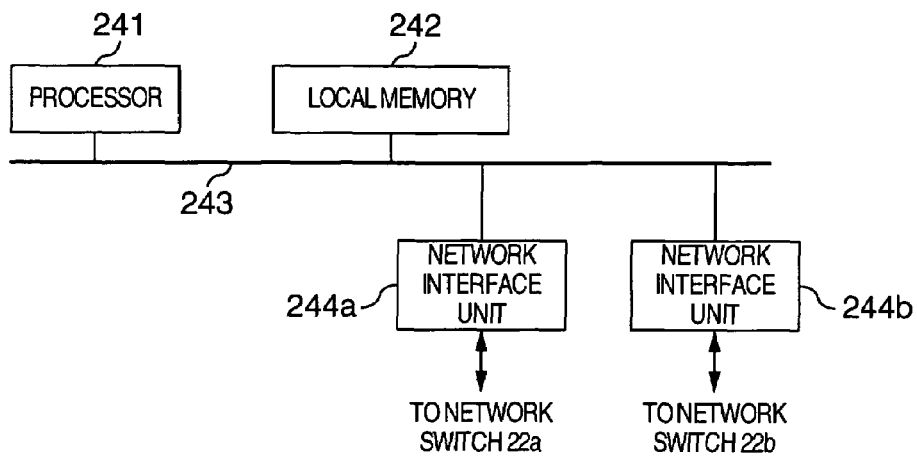
FIG. 17 is a diagram showing an exemplary arrangement of a unified control unit included in the third embodiment.
FIG. 31 is a view showing a second data structure of control information used for recording a channel adapter by which data is sent, included in the cache memory controlling method 4 to be applied to the storage systems according to the first to the third embodiments of the present invention.

The data structure shown in FIG. 31 is composed of a valid mark V for indicating that each entry of the data structure is valid, a RAID group ID for identifying a management unit, a block address for identifying a data block in the management unit, a number of a destination channel adapter, and a mark for indicating a latest data-written channel adapter. The use of the control information entered in the foregoing data structure makes it possible to implement the foregoing control.

The method of controlling data read and write of the front side cache memory and the method of controlling data read of the back side cache memory included in the foregoing cache memory controlling method 4 are the same as the methods described with reference to FIGS. 18, 19 and 20 included in the foregoing cache memory controlling method 1. However, the method of controlling data write onto the back side cache memory is somewhat different.

FIG. 32 is a flowchart showing the third control method for controlling data write in the back side cache memory, the control method being included in the cache memory controlling method 4. In FIG. 32, the process from the steps 420 to 426 is the same as the process of FIG. 21 in the foregoing first cache memory control method. Herein, hence, the process after the step 426 will be described below.

In FIG. 32, the operation goes from the steps 426 to 425 to a step 550. In the step 550, the disk adapter operates to register the channel adapter having issued the write request as the latest writing destination of the concerned data through the use of the data structure as shown in FIG. 31. Next, in a step 430, the operation is executed to check if the other channel adapters are registered as the destination as to the concerned data. This may be executed by retrieving the control information in the data structure as shown in FIG. 31.

In a step 431, the result retrieved in the step 430 is determined. If the result indicates the other channel adapters are not registered, the operation goes to a step 434. If the other channel adapter(s) is registered, the operation goes to a step 434. In this step, the disk adapter operates to send the data newly written in the back side cache memory in the step 426 or 425 to the other registered channel adapter and causes the channel adapter to update the previous data on the front side cache memory being connected with the channel adapter itself.

Proceeding to a step 551, the operation is executed to change the dirty mark D contained in the data structure shown in FIG. 7 into the "written" mark as to the front side cache memory being connected with the other registered channel adapter and then cause the concerned data area to be reused at any time. In the next step 433, the disk adapter operates to determine if the newly written data is sent to all the registered channel adapters. If the channel adapter(s) to which the data is not sent is left, the operation goes back to the step 432 from which the operation is repeated. If the newly written data is sent to all the channel adapters registered as the destination of the concerned data, the operation goes to a step 434. In this step, the disk adapter operates to report the write completion to the channel adapter having issued the write request and then finishes the operation.

As described above, also in the cache memory controlling method 4, the write completion of the concerned data on the front side cache memory is indicated to the other channel adapters than the channel adapter registered as the latest destination to which the data is written. By this, the method of controlling allocation of the front side cache memory is made to be the same as the foregoing cache memory controlling method 1 shown in FIG. 22. Further, the method of controlling allocation of the back side cache memory is slightly different from the foregoing cache memory controlling method 1 shown in FIG. 23.

Figure 33:
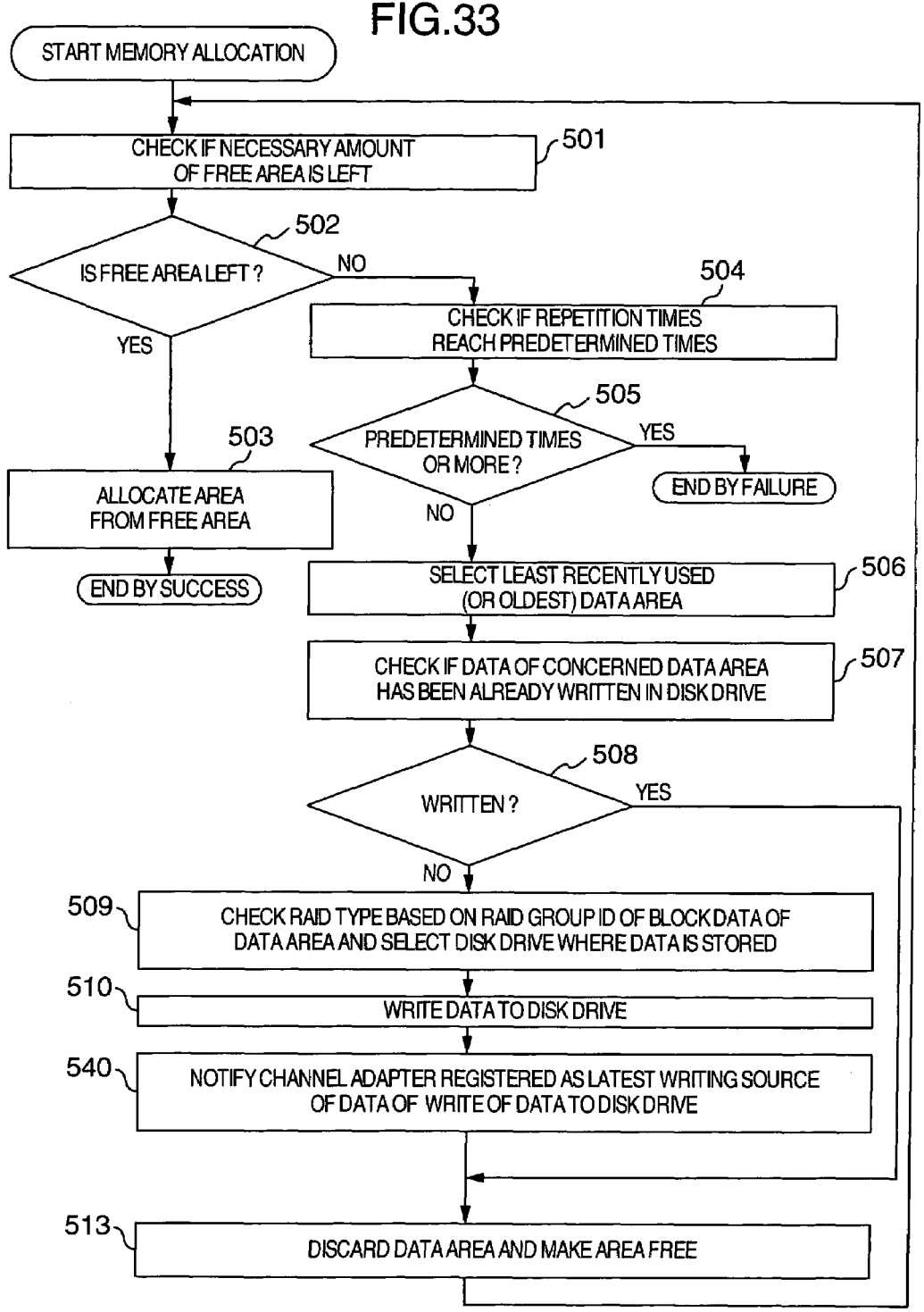
FIG. 33 is a flowchart showing a third control method of controlling allocation of the back side cache memory, included in the cache memory controlling method 4.

FIG. 33 is an explanatory flowchart showing the third control method of allocating an area of the back side cache memory in the cache memory controlling method 4. In FIG. 33, the process from the steps 501 to 510 is the same as the control method described with respect to FIG. 23. Herein, hence, the process of the step 510 or later will be described. In the step 510, like the control method described with respect to FIG. 23, as to the least recently used (or oldest) data area determined in the step 506, the disk adapter operates to write back to the disk drive the remains of the write data, that is, the portion of which is not written back to the disk drive.

Proceeding to a step 540, the disk adapter operates to notify the channel adapter registered as the latest destination to which the concerned data is written of the write-back of the concerned data to the disk drive and causes the channel adapter to change the dirty mark D contained in the data structure as shown in FIG. 7 to be changed into the "written" mark. Unlike the control method described with respect to FIG. 23, nothing is notified to the other channel adapters. In a next step 513, the disk adapter operates to discard the concerned data area on the back side cache memory and make the area free. Afterwards, the operation goes back to the step 501 from which the overall process is repeated.

The method of controlling a write-back of data from the back side cache memory to the disk drive, included in the cache memory controlling method 4, is slightly different from the method described with respect to FIG. 24 included in the foregoing cache memory controlling method 1.

Figure 34:
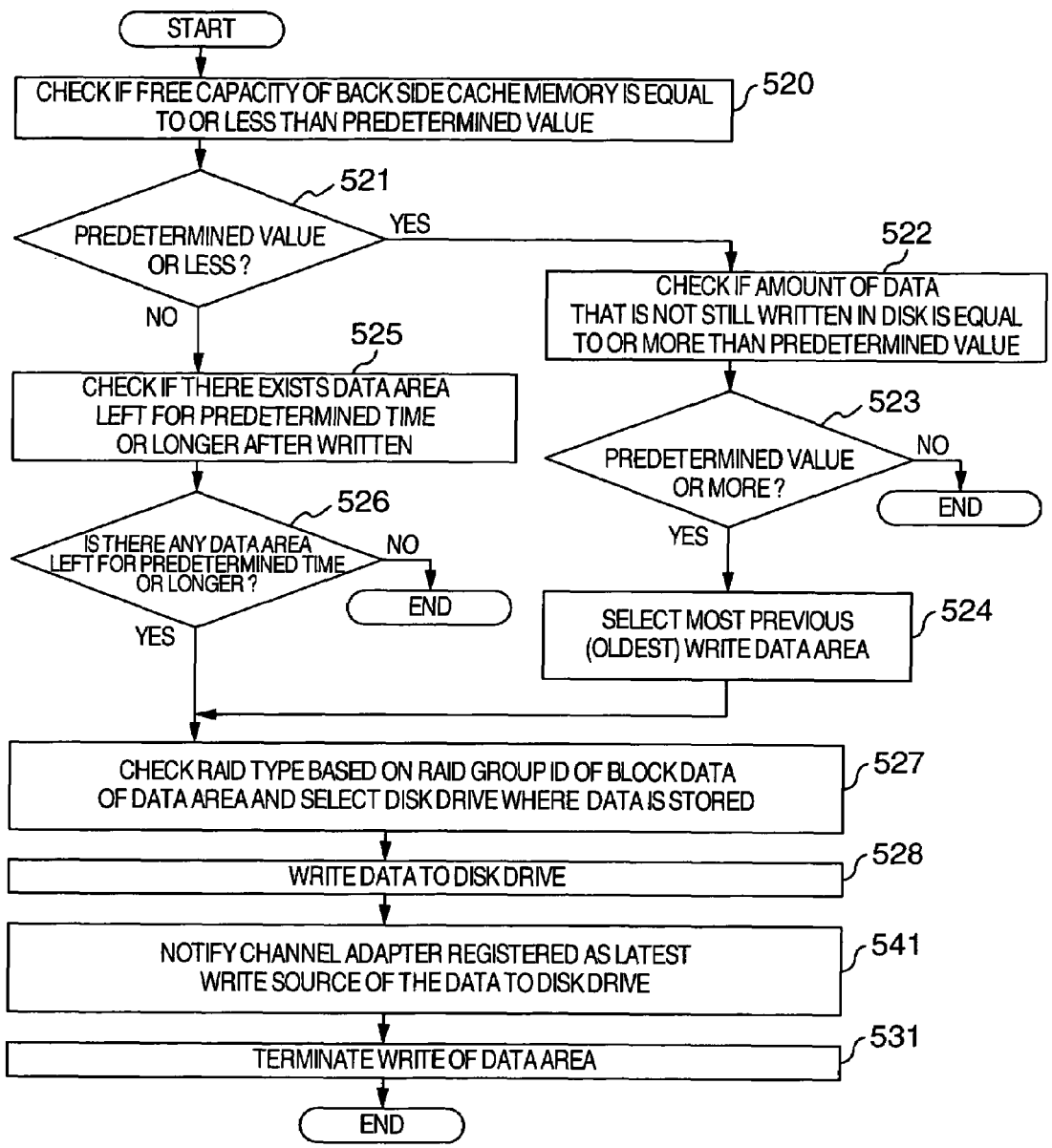
FIG. 34 is a flowchart showing a third control method of controlling write-back (write) of data written in the back side cache memory into the disk drive, included in the cache memory controlling method 4.

FIG. 34 is an explanatory flowchart showing the method of controlling a write-back of data from the back side cache memory, the method being included in the fourth cache memory control method. In FIG. 34, the process from the steps 520 to 528 is the same as the control method described with respect to FIG. 24. Herein, the process after the step 528 will be described. In the step 528, like FIG. 24, the write-back of the write data to the disk drive is executed.

In a next step 541, the disk adapter operates to write back the concerned data to the disk drive and notify the channel adapter registered as the latest destination to which the concerned data is written of the write-back of the concerned data to the disk drive and cause the channel adapter to change the dirty mark D contained in the data structure as shown in FIG. 7 into the "written" mark. At this time, unlike the control method described with respect to FIG. 24, nothing is notified to the other channel adapters. Proceeding to a step 531, the operation is executed to change the dirty mark D of the concerned data area in the data structure as shown in FIG. 9 on the back side cache memory into the "written" mark, indicate the write completion of the concerned data, and then terminate the process.

Fourth Embodiment

FIG. 35 is a block diagram showing an overall arrangement of a storage system according to the fourth embodiment of the present invention. Unlike the foregoing first to third embodiments, the storage system 1 of the fourth embodiment shown in FIG. 35 does not have the channel adapter, the front-end adapter, the disk adapter, and the back-end adapter as identifiable units. It is disclosed as the concrete arrangement of two channels to be connected with the host computer and the associated arrangement therebetween.

In FIG. 35, the storage system 1 is arranged to have host interface units 601a and 601b being connected with a host computer, command data buffers 602a and 602b for temporarily buffering data and control commands received from the host computer, front side cache memories 11a and 11b served as the first kind of cache memory, front-end control units 603a and 603b being connected with the front side cache memories 11a and 11b and for controlling those cache memories processors 605a and 605b, local memories 606a and 606b, back side cache memories 14a and 14b served as the second kind of cache memories, disk drives 15a and 15b, disk drive interface units 607a and 607 being connected with the disk drives 15a and 15b, local exchange units 608a and 608b for connecting the processors 605a and 605b, the local memories 606a and 606b, the back side cache memories 14a and 14b and the disk drive interface units 607a and 607, and a mutual exchange unit 604 for connecting the two front-end control units 603a and 603b with the two local exchange units 608a and 608b. The combination of the host interface unit, the command data buffer, and the front-end control unit corresponds to the channel adapter. The combination of the processor, the local memory, the local exchange unit, and the disk drive exchange unit corresponds to the disk adapter.

In FIG. 35, the front-end control unit 603 executes the primary analysis of the control command from the host computer, which is temporarily stored in the corresponding command data buffer 602. Based on the primary analysis, it is determined if the command received from the host computer is for reading data or for writing data. Further, based on the determined result, the front side cache memory 11 is controlled. For this control, it may be restricted to that the request from the host computer is for reading data and it is determined if the data is located in the front side cache memory 11. If it is, the control is executed only so that the data is sent back to the host computer.

In a case that the data is not stored in the front side cache memory 11 and reading out or writing to the back side cache memory 14 are needed, or that the request from the host computer is for writing data, the front-end control unit 603 operates to notify the processor 605 of the request and to transfer the control to the processor 605. In the local memories 606a and 606b are stored control programs that are executed by the processors 605a and 605b. In place, the data structure as shown in FIGS. 5, 6, 8, 10, 11 and 12 may be stored in these local memories 606a and 606b.

The foregoing arrangement results in making the overall storage system 1 smaller in scale but the fewer components are needed than those of each arrangement of the foregoing first to third embodiments. In addition, the fourth embodiment has an arrangement made by replacing the two network switches of the foregoing embodiments with the mutual exchange unit 604 having a far smaller number of connections. These make it possible to reduce the cost sufficiently in compensation for reduction of the system in scale.

The operation of the storage system according to this embodiment shown in FIG. 35 is substantially same as each storage system of the first to the third embodiments shown in FIGS. 1, 13 and 14. In the data structure for control as shown in FIG. 5, 6, 8, 10, 11 or 12, the adapter numbers may be replaced with the numbers of the front-end control units 603a and 603b (0 and 1) and the disk adapter numbers are replaced with the number of the processors 605a and 605b (0 and 1). In these replacements, the foregoing data structure may be used.

Moreover, the first to the fourth control methods of the cache memory to be applied to the storage systems according to the first to the third embodiments of the present invention may be basically used in the fourth embodiment.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A storage system comprising:
   a plurality of channel adapters being connected with one or more host systems;
   a plurality of first cache memories being connected with said channel adapters respectively and for temporarily storing data to be read and written by said one or more host systems;
   a plurality of disk drives
   a plurality of disk adapters being connected with said disk drives;
   a plurality of second cache memories being connected with said disk adapters respectively and for temporarily storing data to be read from or written in said disk drives; and
   a network for connecting said plurality of channel adapters with said plurality of disk adapters,
   wherein each channel adapter comprises:
   a processor,
   a memory,
   a host interface being connected to one host system, and
   at least one network interface connected to said network,
   wherein said processor, said memory, said host interface and said at least one network interface are being connected to each other, and
   wherein each disk adapter comprises:
   a processor,
   a memory,
   a disk drive interface connected to said disk drives, and
   at least one network interface connected to said network,
   wherein said processor, said memory, said disk drive interface and said at least one network interface are being connected to each other.

2. A storage system as claimed in claim 1, wherein said channel adapter or said disk adapter includes the corresponding processor for controlling said read and write.

3. A storage system as claimed in claim 1, wherein data to be written from said host system is duplicated in said first cache memories and said second cache memories when said data is written.

4. A storage system as claimed in claim 3, wherein said channel adapter includes a disk adapter selection unit for selecting from said plurality of disk adapters a disk adapter being connected with the disk drive served as a source of said data to be read and written by said host system.

5. A storage system as claimed in claim 4, wherein said disk adapter includes a destination channel adapter registration unit for registering a destination one of said channel adapters to which data to be read from and written in said disk drive is sent.

6. A storage system as claimed in claim 5, wherein said disk adapter includes a write completion signaling unit for signaling to said channel adapter registered by said destination channel adapter registration unit that the data written by said host system has been written from said second cache memories to said disk drive, and wherein said channel adapter holds said data written by said host system in said first cache memories until the write of said data in said disk drive is signaled by said write completion signaling unit.

7. A storage system as claimed in claim 1, wherein data to be written from said host system is duplicated in two of said second cache memories when said data is written.

8. A storage system as claimed in claim 7, wherein data to be written from said host system is written in two of said second cache memories and in said first cache memory.

9. A storage system comprising:
a plurality of channel adapters being connected with one or more host systems;
a plurality of first cache memories being connected with said channel adapters respectively and for temporarily storing data to be read and written by said one or more host systems;
a plurality of disk drives;
a plurality of disk adapters being connected with said disk drives;
a plurality of second cache memories for temporarily storing data to be read from or written in said disk drives; and
a network for connecting said plurality of channel adapters, said plurality of disk adapters and said second cache memories with one another,
wherein each channel adapter comprises:
a processor,
a memory,
a host interface being connected to one host system, and
at least one network interface connected to said network,
wherein said processor, said memory, said host interface and said at least one network interface are being connected to each other, and
wherein each disk adapter comprises:
a processor,
a memory,
a disk drive interface connected to said disk drives, and
at least one network interface connected to said network,
wherein said processor, said memory, said disk drive interface and said at least one network interface are being connected to each other.

10. A storage system comprising:
a plurality of channel adapters being connected with one or more host systems;
a plurality of first cache memories being connected with said channel adapters respectively and for temporarily storing data to be read and written by said one or more host systems;
a plurality of disk drives;
a plurality of disk adapters being connected with said disk drives;
a plurality of second cache memories being connected with said disk adapters respectively and for temporarily storing data to be read from or written in said disk drives; and
a network for connecting said plurality of channel adapters with said plurality of disk adapters,
wherein when receiving a write request of data from said host system, said channel adapter stores the data in said first cache memory, wherein said channel adapter specifies a disk adapter connected with a second disk drive as a destination in which said data is stored,
wherein said channel adapter transfers said data stored in said first cache memory to the disk adapter thus specified,
wherein said specified disk adapter writes said data in said second cache memory,
wherein said channel adapter acquires, from said specified disk adapter, identification information indicating that said specified disk adapter has written said data in said second cache,
wherein if it is determined from said identification information, that said specified disk adapter succeeded in writing said data in said second cache memory, said channel adapter validates said data in said first cache memory and reports a write success to said host system, and
wherein if it is determined that said specified disk adapter failed in writing said data in said second cache memory, said channel adapter aborts said data in said first cache memory and reports a write failure to said host system.

11. A storage system according to claim 10, wherein said channel adapter acquires, from said specified disk adapter, write-finished identification information indicating that said specified disk adapter has written said data in said disk drive as the destination, and
wherein if it is determined from said write-finished identification information, that said specified disk adapter has written said data in said disk drive as the destination, said channel adapter deletes said data in said first cache memory.

12. A storage system comprising:
a plurality of channel adapters being connected with one or more host systems;
a plurality of first cache memories being included in said channel adapters respectively and for temporarily storing data to be read and written by said one or more host systems;
a plurality of disk drives
a plurality of disk adapters being connected with said disk drives;
a plurality of second cache memories being included in said disk adapters respectively and for temporarily storing data to be read from or written in said disk drives; and
a network for connecting said plurality of channel adapters with said plurality of disk adapters,
wherein each channel adapter comprises:
a processor,
a memory,
a host interface being connected to one host system, and
at least one network interface connected to said network,
wherein said processor, said memory, said host interface and said at least one network interface are being connected to each other, and
wherein each disk adapter comprises:
a processor,
a memory,
a disk drive interface connected to said disk drives, and
at least one network interface connected to said network,
wherein said processor, said memory, said disk drive interface and said at least one network interface are being connected to each other.

* * * * *